United States Patent
Ravishankar et al.

(10) Patent No.: US 12,294,443 B2
(45) Date of Patent: May 6, 2025

(54) NEXT GENERATION MOBILE SATELLITE SERVICE (MSS)

(71) Applicant: Hughes Network Systems, LLC, Germantown, MD (US)

(72) Inventors: Channasandra Ravishankar, Clarksburg, MD (US); James Jong, North Potomac, MD (US); Gaguk Zakaria, Frederick, MD (US); Nassir Benammar, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 18/584,184

(22) Filed: Feb. 22, 2024

(65) Prior Publication Data
US 2024/0195492 A1  Jun. 13, 2024

Related U.S. Application Data

(62) Division of application No. 17/325,341, filed on May 20, 2021, now Pat. No. 11,949,495.
(Continued)

(51) Int. Cl.
*H04B 7/185* (2006.01)
*H04B 7/26* (2006.01)
(Continued)

(52) U.S. Cl.
CPC ..... *H04B 7/18539* (2013.01); *H04B 7/18513* (2013.01); *H04B 7/18519* (2013.01);
(Continued)

(58) Field of Classification Search
CPC ............ H04B 7/18539; H04B 7/18513; H04B 7/18519; H04B 7/2643; H04W 72/20;
(Continued)

(56) References Cited

U.S. PATENT DOCUMENTS

| | | |
|---|---|---|
| 7,370,116 B2 | 5/2008 | Chan et al. |
| 10,257,078 B2 * | 4/2019 | Faccin ............... H04L 12/6418 |

(Continued)

FOREIGN PATENT DOCUMENTS

| | | |
|---|---|---|
| EP | 3425820 A1 | 1/2019 |
| EP | 3518437 A1 | 7/2019 |
| EP | 3651376 A1 | 5/2020 |

OTHER PUBLICATIONS

"GEO-Mobile Radio Interface Specifications (Release 3); Third Generation Satellite Packet Radio Service; Part 1: General specifications; Sub-part 3: General System Description GMR-1 3G 41.202;ETSI TS 101 376-1-3", ETSI Draft; ETSI TS 101 376-1-3, European Telecommunications Standards Institute (ETSI), 650, Route Des Lucioles ; F-06921 Sophia-Antipolis ; France, vol. SES, No. V3.2.4, Sep. 12, 2012 (Sep. 12, 2012), pp. 1-32, XP014207347, [retrieved on Sep. 12, 2012].

(Continued)

*Primary Examiner* — Bailor C Hsu
(74) *Attorney, Agent, or Firm* — Capitol City TechLaw; Jasbir Singh

(57) ABSTRACT

A system and method for operating a hybrid 4G satellite network. The method includes providing a NGSG including a satellite AS/NAS stack, a terrestrial 4G stack and a relay to connect the satellite AS/NAS stack and the terrestrial 4G stack; transporting a 4G traffic between a 4G UE and the NGSG using a satellite air interface; utilizing a terrestrial network between the NGSG and a 4G CN to transport the 4G traffic; and mapping, with the relay, the 4G traffic between the satellite AS/NAS stack and the terrestrial 4G stack and vice versa, where the satellite air interface is better suited for satellite communications than the terrestrial network. A system and method for multiplexing a first-generation UE and a second-generation UE on a satellite channel.

20 Claims, 9 Drawing Sheets

Related U.S. Application Data

(60) Provisional application No. 63/032,510, filed on May 29, 2020, provisional application No. 63/028,912, filed on May 22, 2020.

(51) Int. Cl.
| | |
|---|---|
| *H04L 47/20* | (2022.01) |
| *H04L 47/629* | (2022.01) |
| *H04W 4/10* | (2009.01) |
| *H04W 28/02* | (2009.01) |
| *H04W 72/0446* | (2023.01) |
| *H04W 72/20* | (2023.01) |

(52) U.S. Cl.
CPC ............ *H04B 7/2643* (2013.01); *H04L 47/20* (2013.01); *H04L 47/629* (2013.01); *H04W 4/10* (2013.01); *H04W 28/0268* (2013.01); *H04W 72/0446* (2013.01); *H04W 72/20* (2023.01)

(58) Field of Classification Search
CPC ............... H04W 4/10; H04W 28/0268; H04W 72/0446; H04L 47/20; H04L 47/629
See application file for complete search history.

(56) References Cited

U.S. PATENT DOCUMENTS

| | | | |
|---|---|---|---|
| 10,321,503 B2* | 6/2019 | Salkintzis | H04W 76/15 |
| 10,848,238 B1 | 11/2020 | Iyer et al. | |
| 11,778,508 B2* | 10/2023 | Jong | H04L 1/0025 |
| | | | 370/329 |
| 2009/0264097 A1 | 10/2009 | Cai et al. | |
| 2011/0078763 A1 | 3/2011 | Kan et al. | |
| 2013/0315125 A1 | 11/2013 | Ravishankar et al. | |
| 2014/0022955 A1* | 1/2014 | Bienn | H04W 4/16 |
| | | | 370/259 |
| 2014/0146682 A1 | 5/2014 | Kakadia et al. | |
| 2015/0365216 A1 | 12/2015 | Chen et al. | |
| 2016/0212737 A1* | 7/2016 | Jang | H04L 65/1016 |
| 2017/0026961 A1 | 1/2017 | Hahn, III et al. | |
| 2017/0208488 A1* | 7/2017 | Hwang | H04W 76/30 |
| 2018/0234943 A1 | 8/2018 | Zakaria et al. | |
| 2018/0242198 A1 | 8/2018 | Choi | |
| 2019/0082481 A1 | 3/2019 | Ravishankar et al. | |
| 2019/0149365 A1 | 5/2019 | Chatterjee et al. | |
| 2019/0260463 A1 | 8/2019 | Gopal et al. | |
| 2020/0092759 A1* | 3/2020 | Dasgupta | H04W 36/0027 |
| 2020/0099443 A1 | 3/2020 | Ravishankar et al. | |
| 2020/0213000 A1 | 7/2020 | Arur et al. | |
| 2020/0322409 A1* | 10/2020 | Ravishankar | H04L 65/103 |
| 2021/0243782 A1 | 8/2021 | Miao | |
| 2021/0367663 A1 | 11/2021 | Ravishankar et al. | |
| 2022/0038554 A1 | 2/2022 | Merwaday et al. | |
| 2022/0052754 A1 | 2/2022 | Dutta | |
| 2022/0086786 A1 | 3/2022 | Narasimha et al. | |
| 2022/0304054 A1* | 9/2022 | Yang | H04W 74/0816 |
| 2023/0052001 A1* | 2/2023 | Ravishankar | H04B 7/18515 |
| 2023/0246705 A1 | 8/2023 | Ji et al. | |
| 2023/0275649 A1 | 8/2023 | Ravishankar et al. | |
| 2023/0110434 A1 | 10/2023 | Holz et al. | |
| 2024/0014934 A1 | 1/2024 | Wang et al. | |
| 2024/0305374 A1* | 9/2024 | Soryal | H04B 7/18513 |

OTHER PUBLICATIONS

"Integration of Satellite and 5G Networks," IEEE Networks Magazine vol. 32, Issue 5, Sep./Oct. 2018.
Communication Relating to the Results of the Partial International Search for PCT Application No. PCT/US2021/033297.
Communication Relating to the Results of the Partial International Search for PCT Application No. PCT/US2021/033311.
Ravishankar Channasandra et al: "Design and performance of an all-Internet Protocol mobile satellite system : Mobile Satellite Systems, 3G and 4G IP", International Journal of Satellite Communications and Networking, vol. 33, No. 4, May 13, 2015 (May 13, 2015), pp. 329-349, XP055841022, GB ISSN: 1542-0973, DOI: 10.1002/sat.1107 the whole document.

* cited by examiner

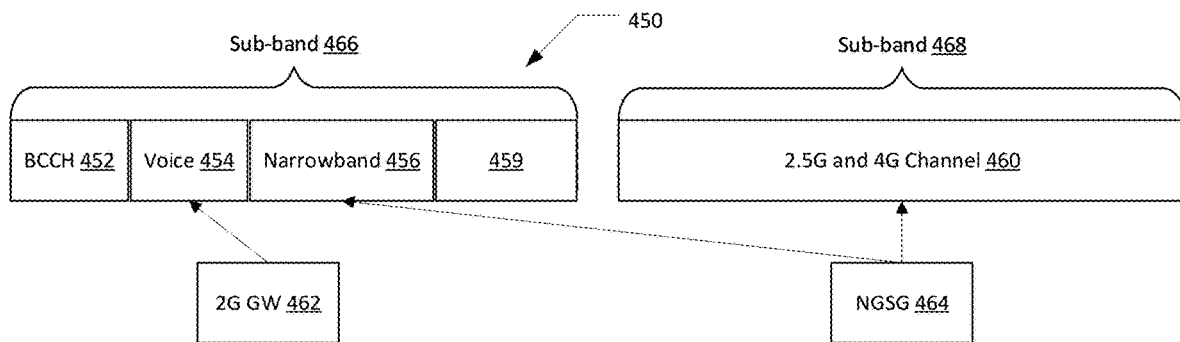
FIG. 4A
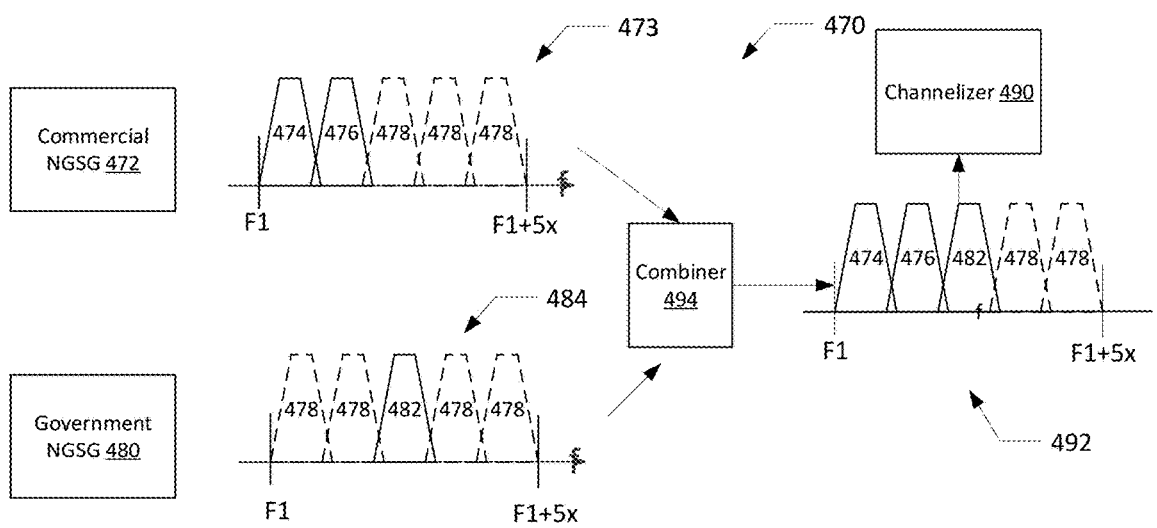
FIG. 4B
FIG. 4C

NEXT GENERATION MOBILE SATELLITE SERVICE (MSS)

CROSS-REFERENCE TO RELATED APPLICATIONS AND INCORPORATION BY REFERENCE

The present application is a divisional of U.S. patent application Ser. No. 17/325,341 filed May 20, 2021, and claims the benefit under 35 U.S.C. 119(e) of U.S. Provisional Application Ser. No. 63/028,912, filed May 22, 2020, and U.S. Provisional Application Ser. No. 63/032,510, filed May 29, 2020, all of which are incorporated herein by reference in their entirety.

FIELD

A system and method to provide a hybrid Next Generation satellite network. The next generation network may include a Fourth Generation (4G) LTE standard network. The hybrid network provides services associated with the 4G to mobile and portable wireless devices using satellite-based communications. The 4G service traffic may be multiplexed with a 2.5G service traffic using a TDMA channel. Physical channels in sub-bands may be utilized to reduce usage of satellite channelizers by different services. Physical channels may be aggregated for obtaining high throughput on a satellite network. The hybrid network may provide a Fair Access Policy (FAP) in a 4G system.

BACKGROUND

Terrestrial cellular networks are based on Second Generation (2G), 2.5G using GPRS (General Packet Radio Service), and fourth Generation (4G) technologies. These technologies coexist. Terrestrial cellular devices, including 2.5G and 4G devices, cannot cover the world. As such, there is a need to connect mobile devices through satellite-based wireless satellite solutions rather than terrestrial 2.5G and 4G. Moreover, conveying a terrestrial 2.5G and 4G signal via a satellite link, even with appropriate frequency translation to the satellite band, is unworkable:
- Due to the large coverage of a satellite beam, as compared to the coverage of a terrestrial cellular base stations.
- Due to the large distance the signal has to travel through (from ground to satellite and from satellite back to the ground).
- Due to the signal strength attenuation associated with the large distance.
- Due to use of Orthogonal Frequency-Division Multiplexing (OFDM) in 4G.

Long Term Evolution (4G LTE) is one implementation of 4G. OFDM signals are used in terrestrial 4G LTE for the Physical (PHY) and Media Access Layers (MAC). However, OFDM signals are not suitable for use in satellite 4G LTE as:
- The OFDM signal has a noise like amplitude with a very large dynamic range needing RF power amplifiers with a high peak to average power ratio.
- It is more sensitive to carrier frequency offset and drift than single carrier systems are due to leakage of the DFT.
- High sensitivity to synchronization errors.
- Nonlinear effects generated by the power amplifier may introduce inter carrier interference and thus destroy the orthogonality.
- Larger sidelobes may result in sensitivity to frequency.

A satellite-based cellular network needs to work across cellular technologies with a large cell size (beam coverage area); a much larger differential Round-Trip Time (RTT); deal effectively with the Doppler effect of satellite-based signaling, and a differential Doppler and Carrier Frequency Offset among users which can cause more ACI. Satellite based systems also need to be more spectrum efficient for communications between a gateway and a UE.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A system of one or more computers can be configured to perform particular operations or actions by virtue of having software, firmware, hardware, or a combination of them installed on the system that in operation causes or cause the system to perform a method for operating a hybrid Fourth Generation (4G) satellite network. One or more computer programs can be configured to perform particular operations or actions by virtue of including instructions that, when executed by data processing apparatus, cause the apparatus to perform the actions. One general aspect includes a method for operating a hybrid 4G satellite network. The method includes providing a NGSG including a satellite AS/NAS stack, a terrestrial 4G stack and a relay to connect the satellite AS/NAS stack and the terrestrial 4G stack; transporting a 4G traffic between a 4G UE and the NGSG using a satellite air interface; utilizing a terrestrial network between the NGSG and a 4G CN to transport the 4G traffic; and mapping, with the relay, the 4G traffic between the satellite AS/NAS stack and the terrestrial 4G stack and vice versa, where the satellite air interface is better suited for satellite communications than the terrestrial network. Other embodiments of this aspect include corresponding computer systems, apparatus, and computer programs recorded on one or more computer storage devices, each configured to perform the actions of the methods.

Implementations may include one or more of the following features. The method may include communicating, via a satellite channel, a 5G traffic via the satellite air interface from a 5G UE to the NGSG; and separating, at the NGSG, the 5G traffic from the 4G traffic communicated over the satellite channel, where the satellite channel is used for the transporting the 4G traffic. The method may include differentiating a QoS for each flow of the 4G traffic across the satellite air interface based on a QCI associated with each of the flows. The differentiating may be performed by a WFQ scheduler. The differentiating may first accommodate a guaranteed bit rate before a best-effort traffic. The method may include embedding a 4G CCCH within a 2G CCCH. The method may include sending an encrypted geolocation of the 4G UE prior to attaching the 4G UE to the 4G CN. The method may include encrypting the 4G traffic using a 256-bit encryption key. The method may include implementing a FAP based on a trigger from the 4G CN. The method may include sending a PTT message from the 4G UE to a multicast gateway in a unicast for multi-casting. The method may include sending unsolicited grants from the NGSG to the 4G UE for TCP flows associated with the 4G UE. The method may include assigning unique user terminal identifiers to virtual network operators; and segregating, at the NGSG, the 4G traffic by the user terminal identifiers. The method may include providing radio frequency transceivers (RFTs); and delaying a transmission of the satellite air interface by a delay associated with a respective RFT of the RFTs. Implementations of the described techniques may include hardware, a method or process, or computer software on a computer-accessible medium.

One or more computer programs can be configured to perform particular operations or actions by virtue of including instructions that, when executed by data processing apparatus, cause the apparatus to perform a method for multiplexing a first-generation UE and a second-generation UE on a satellite channel. One general aspect includes allocating timeslots for TDMA of the satellite channel; associating a first timeslot of the timeslots with a first-generation UE traffic and a second timeslot of the timeslots with a second-generation UE traffic; and communicating, via the satellite channel, between a NGSG and the first-generation UE in the first timeslot and between the NGSG and the second-generation UE in the second timeslot. Other embodiments of this aspect include corresponding computer systems, apparatus, and computer programs recorded on one or more computer storage devices, each configured to perform the actions of the methods.

Implementations may include one or more of the following features. The method may include receiving, at the NGSG, a packet in a select timeslot of the timeslots; and sending the packet either to a first-generation CN when the select timeslot is the first timeslot or to a second-generation CN when the select timeslot is the second timeslot. When the select timeslot is the second timeslot, the sending maps the second-generation UE traffic from a satellite AS/NAS stack to a terrestrial second-generation stack. The method may include sending a packet in a select timeslot of the timeslots from the NGSG either to the first-generation UE when the select timeslot is the first timeslot or to the second-generation UE when the select timeslot is the second timeslot. The method may include mapping the second-generation UE traffic from a terrestrial second-generation stack to a satellite AS/NAS stack when the select timeslot is the second timeslot. The satellite channel may include an aggregated channel including a plurality of carriers. The allocating may schedule a frequency and duration of the first timeslot based on an anticipated first-generation traffic. Implementations of the described techniques may include hardware, a method or process, or computer software on a computer-accessible medium.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 4A illustrates physical channels of different bandwidths according to various embodiments.

FIG. 4B illustrates a method of providing a dedicated government CCCH along with a commercial CCCH according to various embodiments.

FIG. 4C illustrates disposing a Broadcast Control Channel for 4G (BCCH(4G)) in a legacy CCCH according to various embodiments.

Figure 1:
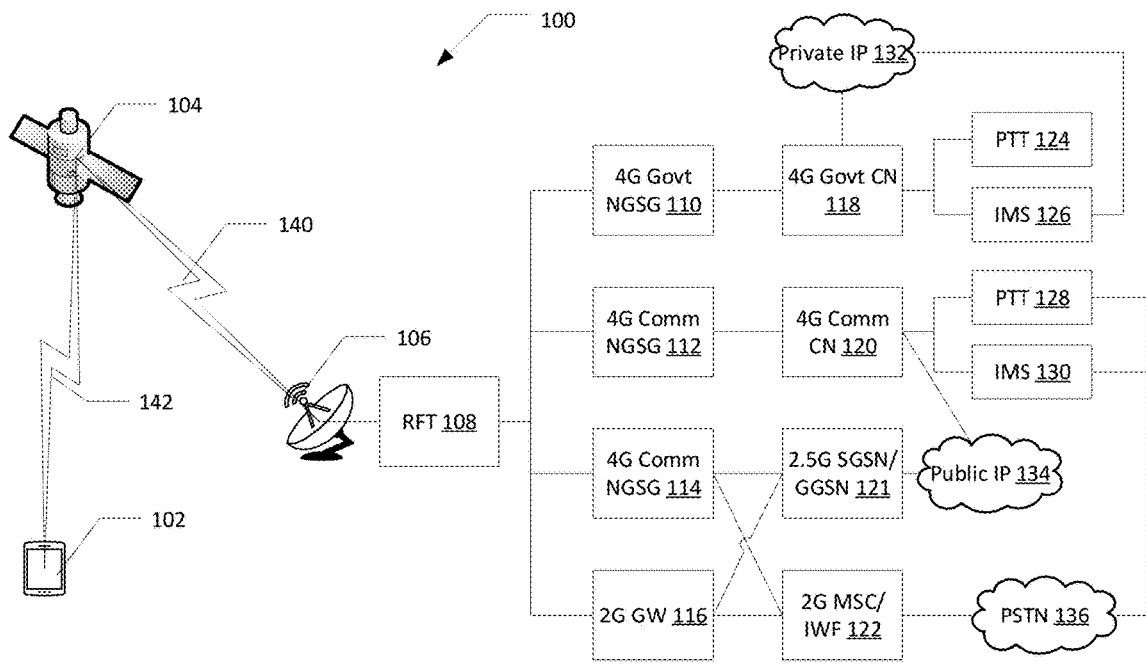
FIG. 1 illustrates an exemplary satellite network providing integrated cellular services according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

The present teachings are related to providing Mobile Satellite Service (MSS) solutions. MSS is a satellite-based communication network intended for use with mobile and portable wireless telephones. There are three major types: aeronautical MSS, land MSS and maritime MSS.

The present teachings disclose:
spectrally efficient and power efficient Low-Density Parity Check (LDPC) physical layer bearers, bearers having greater than 1.024 Mbps data rate by aggregating multiple bearers.

multiplexing legacy and next generation terminals on the same physical bearer to improve resource usage efficiency, feeder link synchronization based on knowledge of satellite ephemeris and satellite beacon reception, Advanced Encryption Standard (AES)-256 based in access stratum based on 3GPP standards, Global Positioning System (GPS) encryption based on early security association establishment, 4G Quality of Service (QOS) based on 4G Quality Class Identifier (QCI) and advanced schedulers, Fair Access Policy (FAP) based on 3GPP Core Network triggers, Push-to-Talk (PTT) with unicast and multicast options, dark beam and regional beam, shared control channels of commercial and government Gateway, and Performance Enhancing Proxy (PEP) improvement for IPSEC flows.

Combined 2.5G and 4G Architecture

FIG. 1 illustrates an exemplary satellite network providing integrated cellular services according to various embodiments.

A satellite network 100 may provide integrated 2G, 2.5G and 4G services to a UT 102 via RF communications 142 between the UT 102 and a satellite 104, and RF communications 140 between the satellite 104 and a gateway 106. The RF communications 140, 142 convey 2G, 2.5G and 4G traffic (user and control) including voice and packet services. The gateway 106 includes a Radio Frequency Transceiver (RFT) 108 connected to separate service providers, for example, government services and commercial services.

The government services for the satellite network 100 may be provided by a 4G Government NGSG 110 to provide government specific services to a 4G government CN 118. The 4G government CN 118 may communicate with a Push-to-Talk (PTT) 124 and an IP Multimedia System (IMS) 126 gateway for the government's use using a private IP network 132. In some embodiments, the private IP network 132 may be conveyed over a public IP network 134.

When the UT 102 is a 4G UT, a 2.5G UT or a Narrowband (NB) device, the commercial services for the satellite network 100 may be provided by a first 4G commercial NGSG 112. The first commercial NGSG 112 may request and provide services from/to a 4G commercial CN 120. An optional second 4G commercial NGSG 114 may be connected to the commercial CN 120 or a different CN (not shown). The first commercial NGSG 112 and the second 4G commercial NGSG 114 may be utilized in a load sharing configuration. The 4G commercial CN 120 may communicate with a PTT 128 and an IMS 130 for commercial use using the public IP network 134. The 4G commercial CN 120 may connect to a Public Switched Telephone Network (PSTN) 136.

When the UT 102 is a 2G UT, commercial voice service services for the satellite network 100 may be provided by a 2G Gateway 116 connected to the PSTN 136 via a 2G Mobile Switching Center (MSC)/Interworking Function (IWF) 122. IP services for the 2G UT 102 may be provided by connecting the 2G Gateway 116 to the public IP network 134 via a 2.5G Serving GPRS Support Node (SGSN)/Gateway GPRS Support Node (GGSN) 121.

Figure 2A:
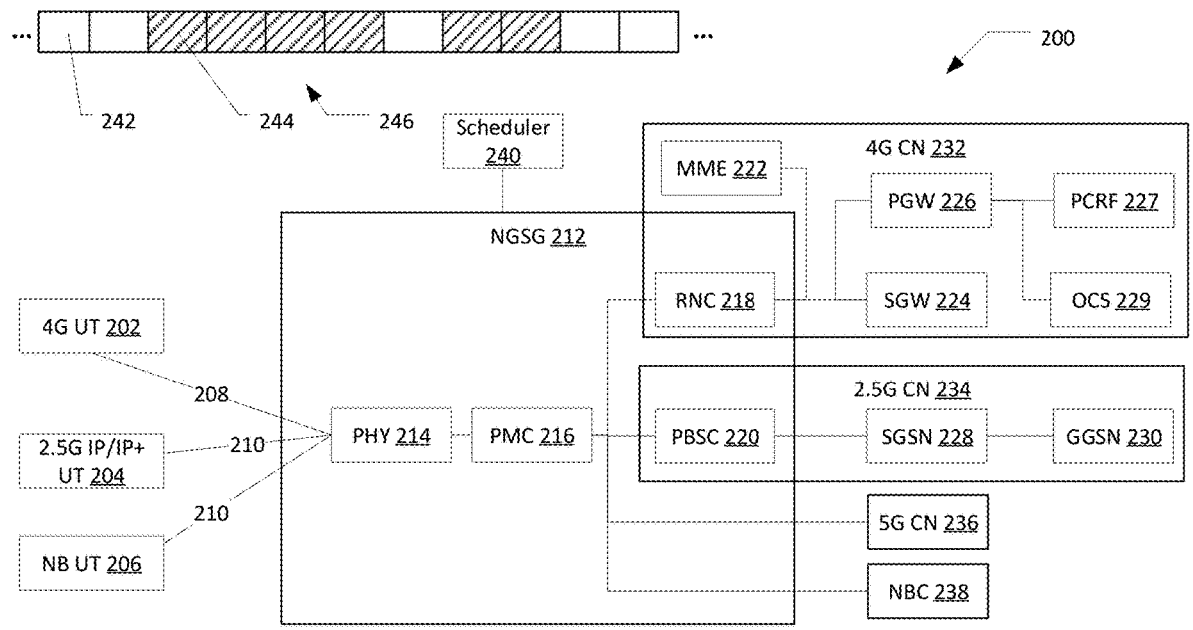
FIG. 2A is a block diagram illustrating an integrated cellular architecture including a Next Generation Service Gateway (NGSG) according to various embodiments.

FIG. 2A is a block diagram illustrating an integrated cellular architecture including a Next Generation Service Gateway (NGSG) according to various embodiments.

A cellular architecture 200 may include a NGSG 212 to connect a 4G UT 202, a 2.5G UT 204 and a Narrowband (NB) UT 206 via a physical layer 214. The integrated cellular architecture 200 provides significant savings on satellite resource utilization. In some embodiments, the NGSG 212 may connect a 5G UT (not shown) to a 5G CN 236.

The 4G UT 202 may communicate 4G traffic via a physical channel 208 (forward or return) with a satellite air interface that is substantially GMR-1 4G compliant. The 2.5G UT 204 may communicate 2.5G traffic via a physical channel 210 (forward or return) with a satellite air interface that is substantially GMR-1 4G compliant. The NB UT 206 may communicate NB traffic via a physical channel 210 (forward or return) with a satellite air interface that is substantially GMR-1 4G compliant. Substantially GMR-1 4G compliant adds some Adaptive Coding and Modulation (ACM), PNB block sizes and the like to the base GMR-1 4G standard. The 2G UT 204 and the NB UT 206 may communicate via a physical channel 210.

The physical channel 208 and the physical channel 210 may be the same sub-band/channel. The physical channel 208 and the physical channel 210 may be multiplexed using TDMA by a scheduler 240 (further discussed in QoS). The scheduler 240 associates each slot of a TDMA channel with a traffic type, for example, 2.5G, 4G, 5G, NB. In a return channel of the RF communications 140, timeslots 242 may be allocated for use one or more 2.5G UTs and timeslots 244 may be allocated for use by one or more 4G UTs. The physical layer 214 of the NGSG 212 communicates all data received on a return channel 246 to a Packet Modem Controller (PMC) 216 as packets with a slot identifier. The PMC 216 separates the packets by traffic type. The PMC 216 may identify the traffic type from the slot identifier and forward the packet to a network associated with the traffic. For example, 4G traffic is forwarded to a 4G core network (CN) 232 via a Radio Network Controller (RNC) 218. The RNC 218 may be connected to an MME 222, an SGW 224, a PGW 226, a PCRF 227 and an OCS 229 included in the 4G CN 232. The 2.5G traffic is forwarded to a 2.5G CN 234 via a Packet Base Station Controller 220. The PBSC 220 may connect to a SGSN 228 and a GGSN 230 included in the 2.5G CN 234. Similarly, NB traffic is forwarded to a Narrowband controller (NBC) 238 and the 5G traffic is forwarded to a 5G CN 236.

Figure 2B:
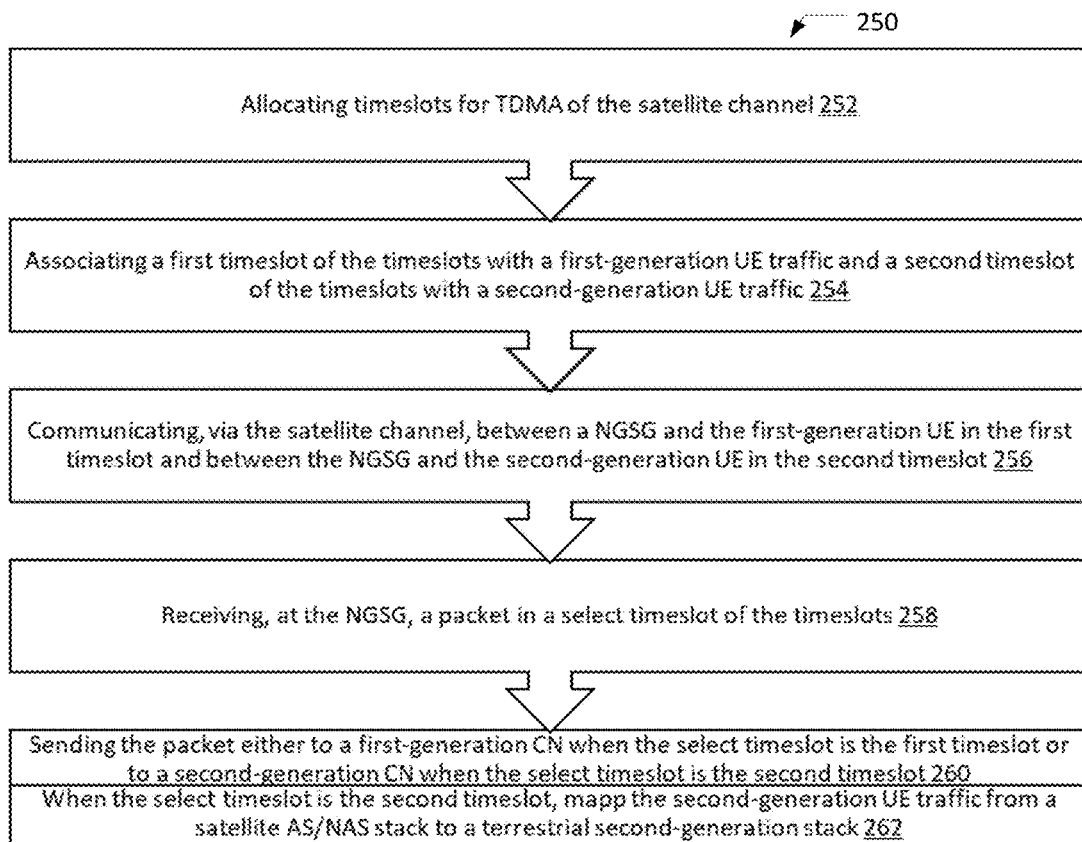
FIG. 2B illustrates a method for multiplexing a first-generation UE and a second-generation UE on a satellite channel, according to various embodiments.

FIG. 2B illustrates a method for multiplexing a first-generation UE and a second-generation UE on a satellite channel, according to various embodiments.

A method 250 for multiplexing a first-generation UE and a second-generation UE on a satellite channel may include an operation 252 for allocating timeslots for TDMA of the satellite channel. The method 250 may include an operation 254 for associating a first timeslot of the timeslots with a first-generation UE traffic and a second timeslot of the timeslots with a second-generation UE traffic. The method 250 may include an operation 256 for communicating, via the satellite channel, between a NGSG and the first-generation UE in the first timeslot and between the NGSG and the second-generation UE in the second timeslot. The method 250 may include an operation 258 for receiving, at the NGSG, a packet in a select timeslot of the timeslots. The method 250 may include an operation 260 for sending the packet either to a first-generation CN when the select timeslot is the first timeslot or to a second-generation CN when the select timeslot is the second timeslot. The method 250 may include an operation 262 for mapping the second-generation UE traffic from a satellite AS/NAS stack to a terrestrial second-generation stack when the select timeslot is the second timeslot.

4G User and Control Plane Over Satellite Links

Figure 3A:
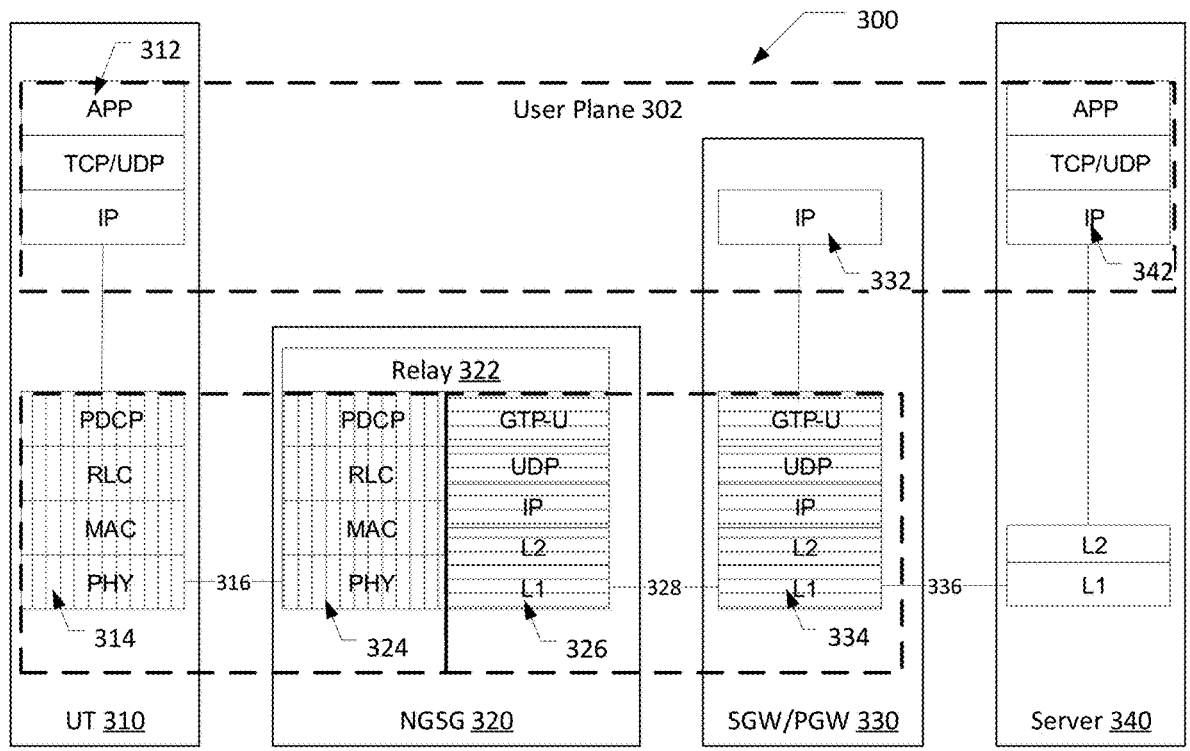
FIG. 3A illustrates a system including a 4G user plane protocol for use with satellite communications according to various embodiments.

FIG. 3A illustrates a system including a 4G user plane protocol for use with satellite communications according to various embodiments.

A system 300 may include a UT 310, a NGSG 320, an SGW/PGW 330 and a server 340. In the system, an End-to-End protocol architecture is based on terrestrial 4G-LTE, while waveforms and lower layer protocols transported via a satellite are optimized for satellite operation. A 4G user plane 302 may use standard IP protocols. The 4G user plane 302 may be provided to the UT 310 as an IP stack 312. The 4G user plane 302 may be provided to the SGW/PGW 330 as IP stack 332. The 4G user plane 302 may be provided to the server 340 as IP stack 342. Each of the IP stacks 312, 332, 342 may include an Application layer, a TCP/UDP layer and an IP layer. The 4G user plane 302 may be used to convey user traffic.

The UT 310 may communicate with the NGSG 320 via satellite specific waveforms and protocols in an Access Stratum (AS) relayed by a satellite (not shown). The UT 310 may include a satellite AS stack 314. The NGSG 320 may include a satellite AS stack 324. The satellite AS stack 314 and the satellite AS stack 324 may communicate using a satellite air interface 316 relayed by the satellite. The satellite air interface 316 may be compliant with the GMR-1 4G protocol. The satellite air interface 316 may be based on ETSI GMR-1/GMR-1 3G standards. The satellite AS stack 314 and the satellite AS stack 324 may include a PDCP layer, a RLC layer, a MAC layer and a PHY layer.

The NGSG 320 may communicate with the SGW/PGW 330 via terrestrial 4G LTE protocols. The NGSG 320 may include a terrestrial 4G stack 326. The SGW/PGW 330 may include a terrestrial 4G stack 334. The terrestrial 4G stack 326 and the terrestrial 4G stack 334 may communicate using a protocol 328. The protocol 328 may be compliant with the S1-U protocol. The terrestrial 4G stack 326 and the terrestrial 4G stack 334 may include a GTP-U layer, a UDP layer, an IP layer, an L2 layer and a L1 layer.

The SGW/PGW 330 may communicate with a server 340 using an IP cloud 336. A relay 322 within the NGSG 320 may map user plane data between the satellite AS stack 324 and the terrestrial 4G stack 326, and vice-versa.

Figure 3B:
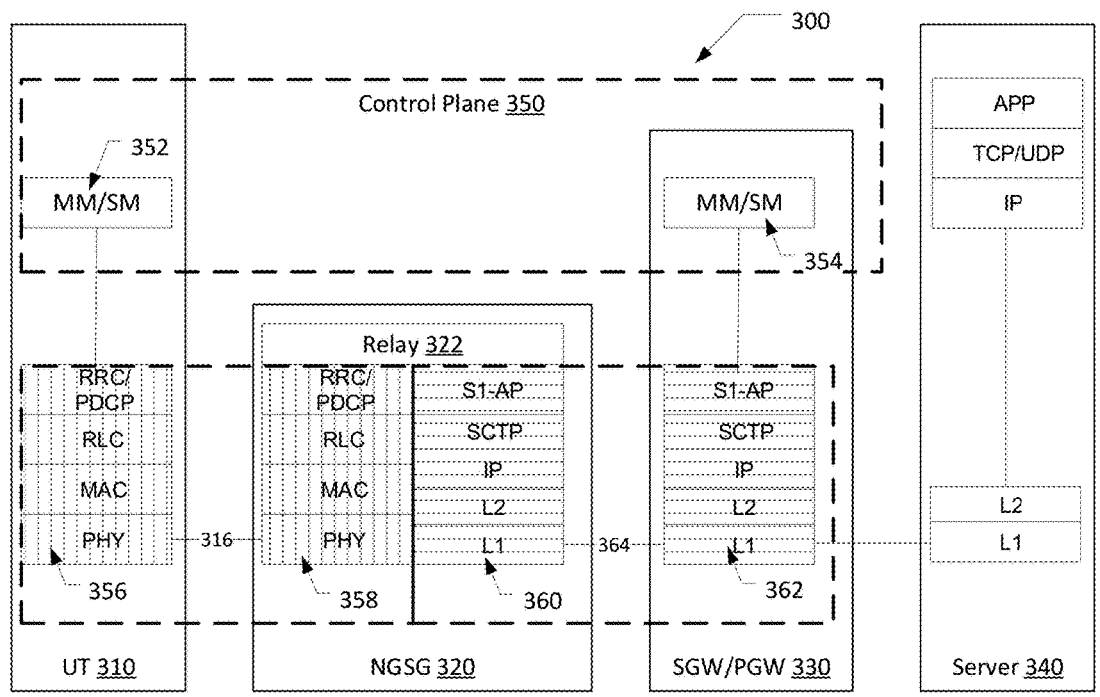
FIG. 3B illustrates a system including a 4G control plane protocol for use with satellite communications according to various embodiments.

FIG. 3B illustrates a system including a 4G control plane protocol for use with satellite communications according to various embodiments.

The system 300 of FIG. 3A may include a 4G control plane 350 to provide Mobility Management/Session Management (MM/SM). The 4G control plane 350 may be provided to the UT 310 as an MM/SM stack 352. The 4G control plane 350 may be provided to the SGW/PGW 330 as MM/SM stack 354. Each of the MM/SM stacks 352, 354 may include an MM/SM layer. The 4G control plane 350 may be used to convey control traffic.

The UT 310 may communicate with the NGSG 320 via satellite specific waveforms and protocols in a Non-Access Stratum (NAS) relayed by a satellite (not shown). The UT 310 may include a satellite NAS stack 356. The NGSG 320 may include a satellite NAS stack 358. The satellite NAS stack 356 and the satellite NAS stack 358 may communicate using the satellite air interface 316 relayed by the satellite. The satellite NAS stack 356 and the satellite NAS stack 358 may include an RRC/PDCP layer, a RLC layer, a MAC layer and a PHY layer.

The NGSG 320 may communicate with the SGW/PGW 330 via terrestrial 4G LTE control protocols. The NGSG 320 may include a terrestrial 4G control stack 360. The SGW/PGW 330 may include a terrestrial 4G control stack 362. The terrestrial 4G control stack 360 and the terrestrial 4G control stack 362 may communicate using a protocol 364. The protocol 364 may be compliant with the S1-MME protocol. The terrestrial 4G control stack 360 and the terrestrial 4G control stack 362 may include a S1-AP layer, a SCTP layer, an IP layer, an L2 layer and a L1 layer.

The relay 322 within the NGSG 320 may map control plane data between the satellite NAS stack 358 and the terrestrial 4G control stack 360, and vice-versa. The terrestrial 4G stack may include the terrestrial 4G control stack. The satellite AS stack and satellite NAS stack together may be referred to as the satellite AS/NAS stack. The protocol 328 and the protocol 364 together may be referred to as the terrestrial network. The user traffic and control traffic together may be referred to as 4G traffic.

The satellite air interface 316 may be conveyed by bearers that are unidirectional. Bearers from the UT to the NGSG via the satellite may be referred to as return links. Bearers from the NGSG to the UT via the satellite may be referred to as forward links. The forward and return links may use a wide range of bearer types to support efficient resource allocation, multiple terminal types with different RF capabilities and dynamic link adaptation. Moreover, the forward and return links may use advanced modulation and coding for power efficiency, spectral efficiency and improved link margins. In some embodiments, an advanced receiver may be used to provide robust performance and an improved link margin.

Figure 3C:
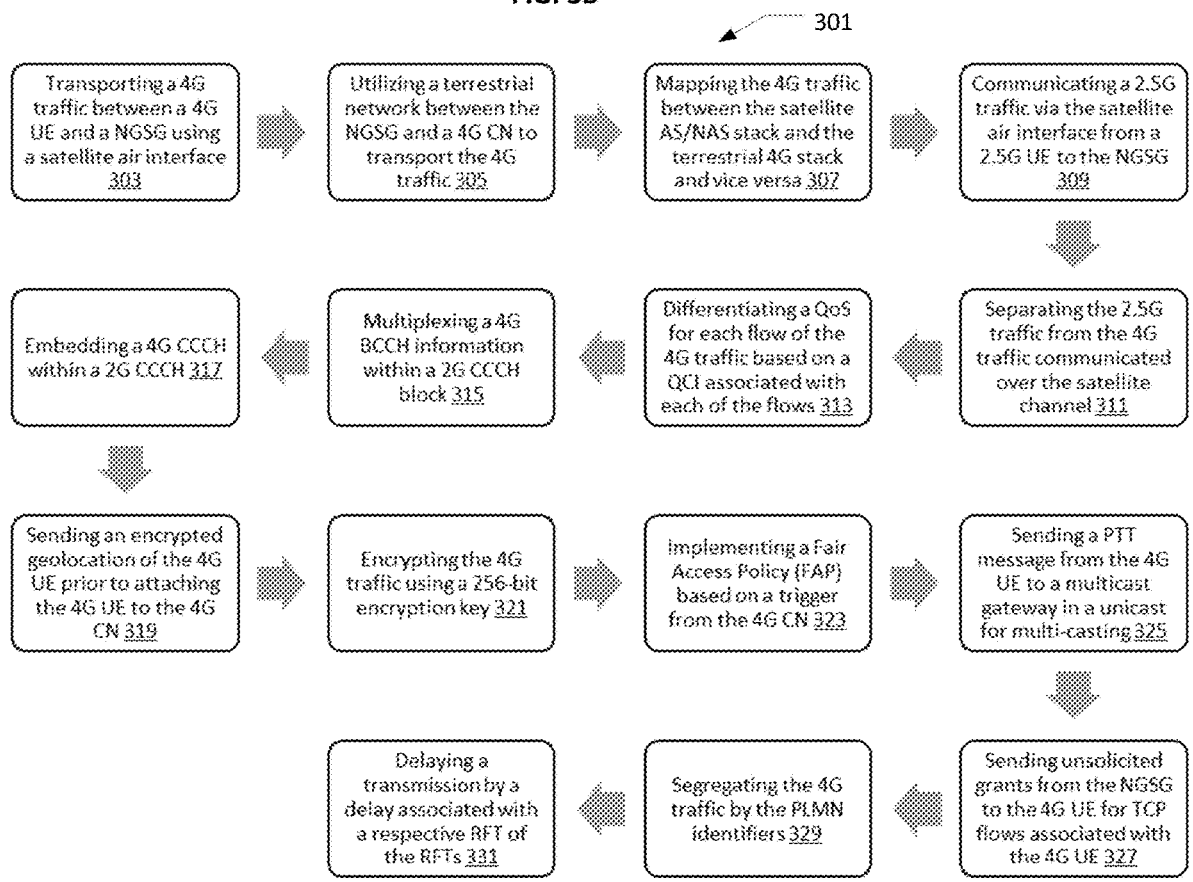
FIG. 3C illustrates a method for operating a hybrid Fourth Generation (4G) satellite network, according to various embodiments.

FIG. 3C illustrates a method for operating a hybrid Fourth Generation (4G) satellite network, according to various embodiments.

A method 301 for operating a hybrid Fourth Generation (4G) satellite network may include operation 303 for transporting a 4G traffic between a 4G UE and a NGSG using a satellite air interface. The method 303 may include operation 305 for utilizing a terrestrial network between the NGSG and a 4G CN to transport the 4G traffic. The method 303 may include operation 307 for mapping the 4G traffic between the satellite AS/NAS stack and the terrestrial 4G stack and vice versa.

The method 303 may include operation 309 for communicating a 2.5G traffic via the satellite air interface from a 2.5G UE to the NGSG. The method 303 may include operation 311 for separating the 2.5G traffic from the 4G traffic communicated over the satellite channel. The method 303 may include operation 313 for differentiating a QoS for each flow of the 4G traffic based on a QCI associated with each of the flows. The method 303 may include operation 315 for multiplexing a 4G BCCH information within a 2G CCCH block 315. The method 303 may include operation 317 for embedding a 4G CCCH within a 2G CCCH. The method 303 may include operation 319 for sending an encrypted geolocation of the 4G UE prior to attaching the 4G UE to the 4G CN. The method 303 may include operation 321 for encrypting the 4G traffic using a 256-bit encryption key. The method 303 may include operation 323 for implementing a FAP based on a trigger from the 4G CN. The method 303 may include operation 325 for sending a PTT message from the 4G UE to a multicast gateway in a unicast for multi-casting. The method 303 may include operation 327 for sending unsolicited grants from the NGSG to the 4G UE for TCP flows associated with the 4G UE. The method 303 may include operation 329 for segregating the 4G traffic by the PLMN identifiers. The method 303 may include operation 331 for delaying a transmission by a delay associated with a respective RFT of the RFTs.

S1 Flex Support

NGSG supports S1-Flex as defined in 3GPP and MME/SGW load balancing "Relative MME Capacity" advertised by the different MME. as such, user contexts may be load balanced in the core network. The load-balancing may minimize signaling load for site diversity feature. The Government NGSG in each site may have connectivity to MMEs/SGWs to a variety of sites. In some embodiments, multiple MMEs may form a MME pool. When an S1 link is established between the MMEs, each MME provides "Relative MME Capacity for Load Balancing" information to the NGSG. The Relative MME Capacity maybe set according to the capacity of an MME node relative to other MME nodes in the MME-pool. The probability of the NGSG selecting an MME is proportional to its Relative MME Capacity. When a UT sends an Attach Request, NGSG may choose an MME based on the "Relative MME Capacity" of each MME. In some embodiments, the MME can release a UT in ECM-CONNECTED mode for load balancing. The MME initiates S1 release procedures with release cause "load balancing TAU (Tracking Area Update) required". The S1 and RRC connections are released, and the UT initiates a TAU in order to re-attach to the 4G CN.

Physical Channel of Different Bandwidths

A frequency spectrum of a satellite may be divided into sub-bands. Sub-bands may include n channels for n carriers, for example, 5 channels. The channels may be aggregated, such that a number of the channels may be grouped to form an mx channel, where m is a count and x is a bandwidth of the channel. In some embodiments, an aggregated channel may include m carriers. In some embodiments, the aggregated channel may include a single carrier. In some embodiments, the full range of a sub-band may be treated as one channel, i.e., a nx channel. The present teachings disclose assigning channels in a sub-band to more than mobile satellite service (MSS), for example, a 2.5G, a 4G service. The teachings also disclose aggregated channels. The number of channels in a sub-band correspond to a capacity of a satellite channelizer. In a satellite, the number of channelizers in a satellite is limited. As such, using a channelizer to provide many MSSs in the satellite is advantageous.

FIG. 4A illustrates physical channels of different bandwidths according to various embodiments.

A frequency spectrum 450 may include a sub-band 466 and a sub-band 468. Sub-band 466 may include a BCCH channel 452, a voice channel, a NB channel 456 and a reserved channel 459. In some embodiments, the NB channel 456 may be a 2× channel. A 2G GW 462 may manage the voice channel 454.

Sub-band 468 may include an integrated 2.5G and 4G channel 460. The integrated 2.5G and 4G channel 460 may be a 5× channel. The sub-band 468 may be managed by a NGSG 464. The integrated 2.5G and 4G channel 460 may convey 2.5G traffic and 4G traffic. By integrating more than one service in a channel, the satellite bandwidth may be better utilized. This allows channelizer sharing in the satellite and reduces the number of satellite channelizers needed. This may reduce the satellite power consumed.

The present teachings pack channels (single or aggregated) of various services into a sub-band to better utilize a capacity of a satellite channelizer. This may reduce the number of satellite channelizers needed. In some embodiments, the satellite network may provide 2G services. A voice channel 454 within the sub-band 466 may be used to provide 2G services. The sub-band 466 used for 2G services may be different than the sub-band 468 used for 2.5G or 4G services. The 2G services may be provided by the 2G GW 462. However, only some of the channels of the sub-band 466 are used by the voice channel 454. As illustrated, a NB channel 456 may be disposed in one or more of the unused channels of the sub-band 466. The NB channel 456 may be a single or aggregated channel, for example, a 2× channel. Here, the NB services are managed by the NGSG 464 rather than the 2G GW 462. The sub-band 468 may be used to provide 2.5G and 4G services by the NGSG 464.

By using unused portions of a sub-band and integrating more than one service into an integrated channel, the present teachings use only 2 sub-bands, 2 satellite channelizers and zero booking of satellite power for IP+ in a beam to provide 2G, NB and integrated 2.5G and 4G services. In contrast, at minimum, the prior art non-integrated channels require 4 sub-bands, 4 satellite channelizers and booking of associated satellite power in a beam to provide 2G, 2.5G (voice and IP+), NB and 4G services. The non-integrated channels require at least 3 dB higher satellite power. The following table illustrates an exemplary embodiment comparison.

| Attribute | Non-Integrated 2.5 G and 4 G Approach | Integrated 2.5 G and 4 G Approach |
| --- | --- | --- |
| Spectrum utilization per beam for active users | Requires minimum of two sub-bands | Requires minimum of 1 sub-band |
| Satellite channelizer utilization per beam | minimum of 2 | minimum of 1 |
| Total L-band spectrum in coverage area for 2.5 G support | Up to ~31.25 MHz (200 sub-bands: NGPGS = 150, GGW = 50) | Does not require any additional spectrum for 2.5 G |
| Total SAT channelizers for 2.5 G support | Up to 200 | None dedicated for 2.5 G support |
| Satellite Power Impact | Legacy 5x carriers, when allocated in a beam will require dedicated satellite power (approximately 64 dBW if all 200 sub-bands are used in coverage area); this power cannot be shared with NGSG | No need to set aside satellite power for 2.5 G. All available power shared between 2.5 G and 4 G based on demand |
| Dedicated hardware for 2.5 G and 4 G | Yes-each needs to be sized to its projected max capacity | No. Integrated hardware subject to single max capacity |
| Ability for 4 G to use unassigned slots of 2.5 G aggregated channels | No | Yes. |

| Attribute | Non-Integrated 2.5 G and 4 G Approach | Integrated 2.5 G and 4 G Approach |
|---|---|---|
| Ability for 4 G users to share GMPRS channels with APSI terminals | No | Yes. This feature also is geared towards minimizing sub-band and channelizer usage |
| Throughput impact on 4 G | Reduction in 4 G throughput due to satellite resource robbing from 2.5 G | Up to ~70 Mbps increase in satellite throughput relative to dis-joint approach |

Satellite Channelizer Sharing

FIG. 4B illustrates a method of providing a dedicated government CCCH along with a commercial CCCH according to various embodiments.

A method 470 of providing a dedicated government CCCH along with a commercial CCCH may include a commercial NGSG 472 to generate sub-band 473 ranging from a frequency F1 to F1+5×, or 5 channels. The sub-band 473 from the commercial NGSG 472 includes a 2G CCCH 474 (may also be used 4G BCCH by the commercial NGSG 472), for example, in a first channel of the sub-bands 473. The sub-band 473 from the commercial NGSG 472 may include a voice channel 476, for example, in a second channel of the sub-band 473. Some channels of the sub-band 473 may be unused/reserved channels 478. The method 470 may include a government NGSG 480 to generate a sub-band 484 ranging from a frequency F1 to F1+5×. The sub-band 484 from the government NGSG 480 may include a government CCCH 482, for example, in a third channel. Some channels of the sub-band 484 may be unused/reserved channels 478. The first, second and third sub-bands are different.

From a satellite point of view, a single channelizer 490 is used for the commercial CCCH and the government CCCH. The sub-bands 473 and sub-bands 484 are combined by a combiner 494 prior to being an input to the single channelizer 490 to form the sub-band 492. In some embodiments, a position of the channels used in the sub-bands 473 and 484 do not overlap. In other words, a used channel of the sub-band 473 corresponds in position to an unused/reserved channel 478 of the sub-band 484. As such, a dedicated channelizer in the satellite is not needed to provide a dedicated CCCH for the Government NGSG 480. One advantage is that less than 1% of satellite power consumed by this CCCH. Analogously, a corresponding return link CCCH (RACH) is configured to be processed by Government NGSG. A Global Resources Manager (GRM) is blocked from allocating the government CCCH for legacy operation.

Control Channels

One Common Control Channel (CCCH) carrier may be used transmit system information related to the legacy and next generation services, such as the GMR-1, GMPRS and GMR-1 4G services. The present teachings disclose using a legacy CCCH for NGSG users. By multiplexing the CCCH of next generation services with the CCCH of the legacy services an additional CCCH carrier for next generation services is not needed. The multiplexing may eliminate a need for regional beam CCCH and associated satellite channelizer. The multiplexing may eliminate a need for a NGSG to generate a next generation CCCH.

FIG. 4C illustrates disposing a Broadcast Control Channel for 4G (BCCH(4G)) in a legacy CCCH according to various embodiments.

In some embodiments, a 4G BCCH (4G field 402 is disposed in a reserved/unused portion of the 2G CCCH block 400 such that beam selection and beam reselection algorithms (using fields BCCH1 . . . BCCH8) are not impacted for legacy terminals.

In some embodiments, a dedicated CCCH for a government gateway can be provided. To conserve channelizers on satellite, a 1× channel from the commercial (legacy and next generation) BCCH sub-band may be used for the government CCCH. This 1× channel may be dedicated to Government NGSG.

Figure 4D:
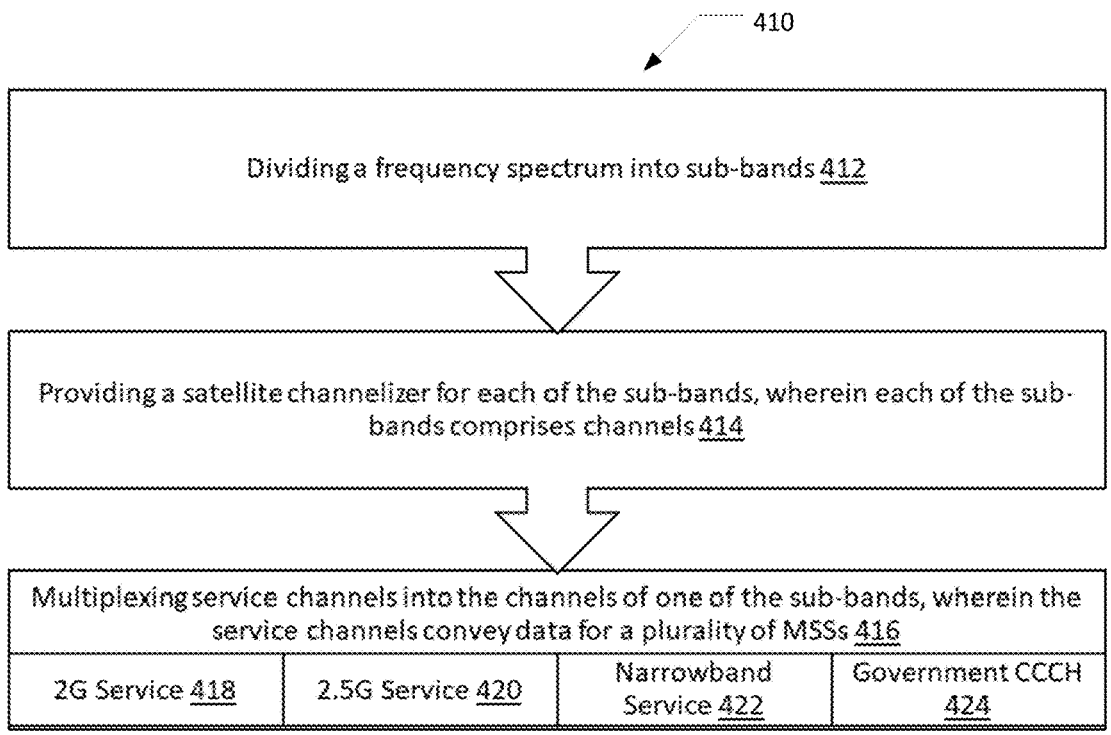
FIG. 4D illustrates a method for reducing usage of satellite channelizers according to various embodiments.

FIG. 4D illustrates a method for reducing usage of satellite channelizers according to various embodiments.

A method 410 for reducing usage of satellite channelizers may include an operation 412 for dividing a frequency spectrum into sub-bands. The method 410 may include an operation 414 for providing a satellite channelizer for each of the sub-bands, wherein each of the sub-bands comprises channels. The method 410 may include an operation 416 for multiplexing service channels into the channels of one of the sub-bands, wherein the service channels convey data for a plurality of MSSs. Exemplary MSSs include 2G Service, 2.5G Service, Narrowband Service, and a Government CCCH.

Global Channels

Global beams may operate with a waveform having very low SNR, for example, less than −6.5 dB. The waveform having a very low SNR may also be used for carrying spectrally efficient, delay efficient and battery efficient IoT with small devices.

The Global beam may include Logical Channels. A Global Broadcast Control Channel (GBCCH) is a forward channel that may carry system frame number, system identity, beam information, and other system information. A Global Access Grant Control Channel (GAGCH) is a forward channel that may be used to acknowledge UT requests. A Global Random Access Channel (GRACH) is a return channel that is used by the UTs to request access.

The global beam may include Global beam Physical channels. A GRS (Global Reference Signal) is a chirp based physical signal to aid terminal initial synchronization. A GCCH (Global Common Control Channel) carries either GBCCH or GAGCH logical channel. A GRACH: carries GRACH logical channel. In some embodiments, the global physical channels may be used for IoT devices to carry small data messages (e.g., location information). In one embodiment, a forward channel may support TDM, 19 bytes of payload, a 23.4 ksps symbol rate, Power efficient π/2-BPSK and a robust FEC (for example, Conventiomal/Turbo) with repetition. In one embodiment, the return channel may support slotted Aloha, 8 bytes of payload, a 5.85 ksps symbol rate, Power efficient π/2-BPSK and a robust FEC K=11 Conv. with repetition.

Carrier/Channel Aggregation

Communications at a high bandwidth (BW) between a UT and a NGSG at a gateway may be achieved via channel aggregations. For example, a BW of 1024 kbps may be provided with three 156.25 kHz channels within the power constraints of the satellite in a forward link. Wide range of bearers, carrier aggregation and dynamic adaptation link allows higher than 2 Mbps to be achieved even with user terminals with G/T=−15 dB/K. The channels need not be contiguous. In some embodiments, more than three channels may be aggregated. A channel may include multiple carriers. For example, 5× carriers may be used in channels used for either the forward or the return link. In some embodiments, carrier aggregation may be supported in a return link. While carrier aggregation in a return link without contiguous carriers is supported, practical RF performance considerations such as C/Im in the UT might necessitate use of contiguous carriers in the return link.

In some embodiments, a channel can be added or removed from a beam without tearing down sessions. As such, spectrum may be borrowed from lightly loaded beams (subject to reuse constraints) to create hot-spots and respond to changing demands by adding or removing channels from the beam. This may support a capability to move between spectrally efficient to power efficient methods. A legacy UT can seamlessly share a channel (5× or 1×) with a new generation UT.

In some embodiments, it is possible to close links at 355 kbps with positive margin with a UT EIRP of 15.1 dBW using existing 5× bearers. The Gateway may achieve >18 dB C/(N+I) with more than 10 dB of rain margin. In some embodiments, it is possible to use a wide range of bearers, carrier aggregation and dynamic adaptation link to achieve higher than 2 Mbps even with user terminals with G/T=−15 dB/K. Adaptive Coding and Modulation (ACM) may allow user terminals to achieve more than 1.2 Mbps using just three 5× channels. In one embodiment, a chipset may permit more than three channels to be aggregated allowing peak speeds of more than 2 Mbps per UT.

Figure 5A:
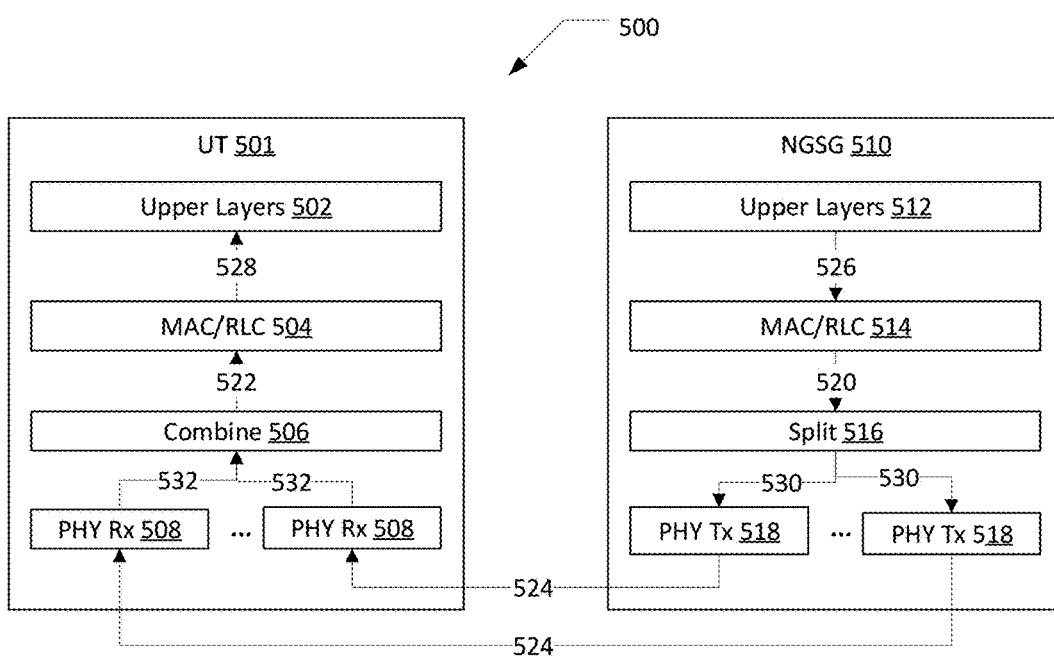
FIG. 5A illustrates an exemplary carrier aggregation system according to various embodiments.

FIG. 5A illustrates an exemplary carrier aggregation system according to various embodiments.

A carrier aggregation system 500 may be used to provide services over a satellite. The carrier aggregation system 500 may be used to communicate from a NGSG 510 to a UT 501, i.e., the forward link. In some embodiments, not shown, the carrier aggregation system 500 may be used to communicate from the UT 501 to the NGSG 510, i.e., the return link. Packets from the upper layers 512 of the NGSG 510 may be provided to a MAC/RLC layer 514 for transmission over an aggregated channel 526 to the UT 501. The aggregated channel 526 may be a logical construction of PHY Transmission (Tx) channels 518. In some embodiments, UT 501 may be a 2.5G UT, a 4G UT or the like. For the aggregated channel 526, the MAC/RLC layer 514 may send the packets as a data stream 520 to a split module 516. The split module 516 distributes or demultiplexes portions of the data stream 520 as sub-data streams 530 over the PHY Tx channels 518. Each of the PHY Tx channels 518 may use a unique carrier. The demultiplexing by the split module 516 may be based on bandwidth availability on each of the PHY Tx channels 518.

From the perspective of the UT 501, transmissions received over the PHY Tx channels 518 are receptions over the PHY Rx channels 508. When the PHY Rx channels 508 are part of an aggregated channel 528, the receptions over the carriers 524 are provided to a combine module 506 as sub-data streams 532. The combine module 506 integrates/multiplexes the sub-data streams 532 to generate a data stream 522 for a MAC/RLC layer 504. The MAC/RLC layer 504 forwards the data stream 522 to appropriate endpoints in the upper layers 502. In some embodiments, an order of transmissions is restored in the combine module 506. In some embodiments, the order of transmissions is not restored in the combine module 506. In such embodiments, if the order is relevant, it may be restored by one of the upper layers 502 in the UT 501.

In some embodiments, not shown, the carrier aggregation system 500 may be used to communicate from the UT 501 to the NGSG 510. In such embodiments, a combine module is added to the NGSG 510 and a split module is added to the UT 501. In some embodiments, generations other than 2.5G and 4G may be multiplexed into the data stream 520 by the MAC/RLC layer 514.

Figure 5B:
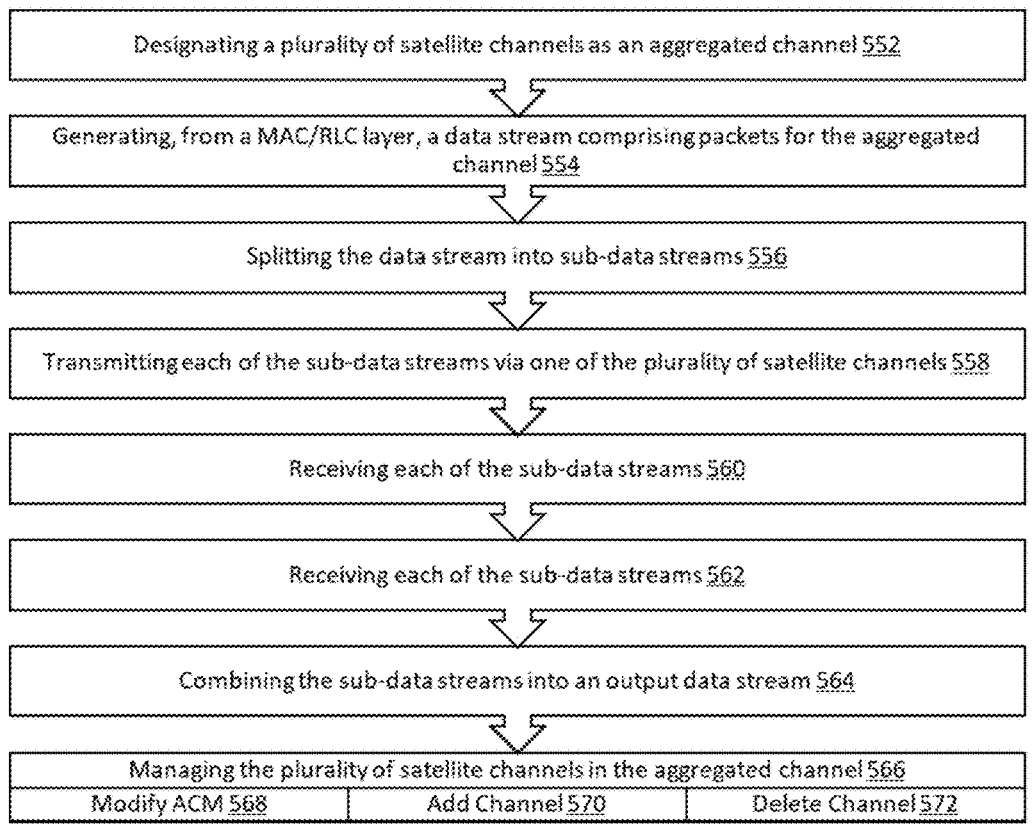
FIG. 5B illustrates a method for obtaining high throughput on a satellite network according to various embodiments.

FIG. 5B illustrates a method for obtaining high throughput on a satellite network according to various embodiments.

A method 550 for obtaining high throughput on a satellite network may include an operation 552 for designating a plurality of satellite channels as an aggregated channel. The method 550 may include an operation 554 for generating, from a MAC/RLC layer, a data stream comprising packets for the aggregated channel. The method 550 may include an operation 556 for splitting the data stream into sub-data streams. The method 550 may include an operation 558 for transmitting each of the sub-data streams via one of the plurality of satellite channels. The method 550 may include an operation 560 for receiving each of the sub-data streams. The method 550 may include an operation 562 for receiving each of the sub-data streams. The method 550 may include an operation 564 for combining the sub-data streams into an output data stream. The method 550 may include an operation 566 for managing the plurality of satellite channels in the aggregated channel. The operation 566 may include a module 568 to modify ACM being used in the channel, a module 570 to add a channel and a module 572 to delete a channel.

IP Supported Quality of Service (QOS)

In some embodiments, the present teachings support QoS differentiation across users and applications. A single UT may simultaneously handle multiple applications each requiring a different QoS. Bearers associated with different QCIs get different treatments. Multiple hosts may be connected to same UT, each host running multiple applications. In addition to differentiation across applications and NGSG users, seamless real-time differentiation across NGSG users and legacy users may be provided.

Figure 6:
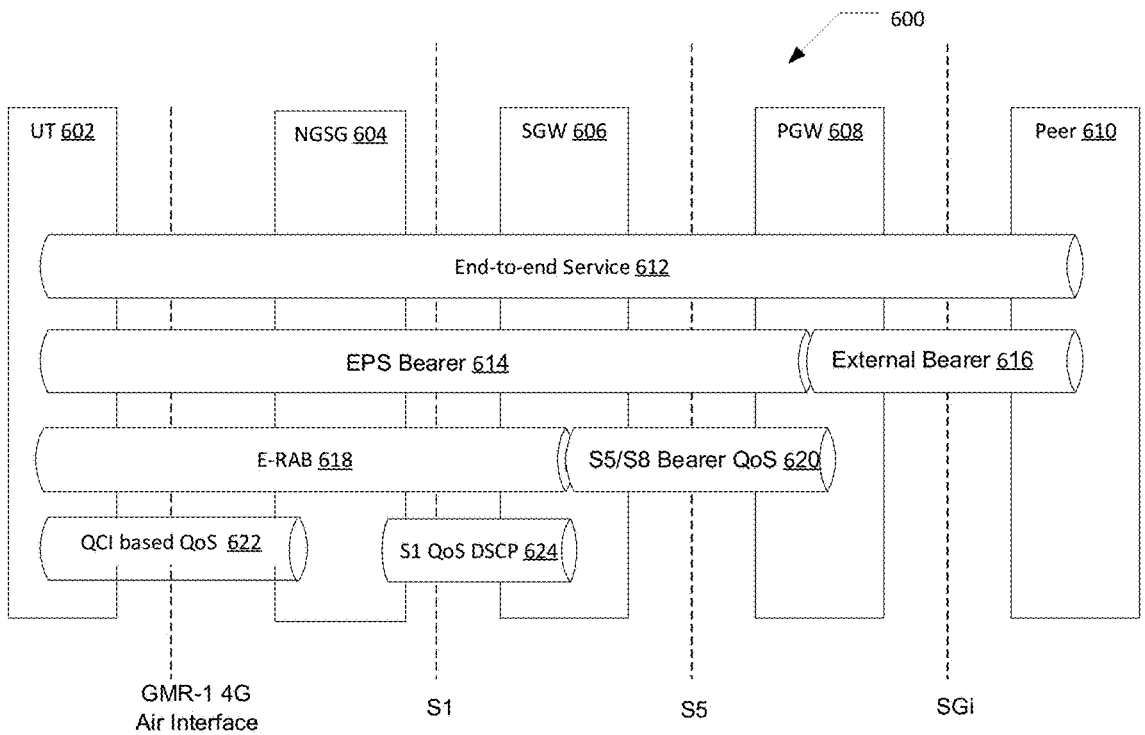
FIG. 6 illustrates an exemplary Quality of Service system according to various embodiments.

FIG. 6 illustrates an exemplary Quality of Service system according to various embodiments.

FIG. 6 illustrates a QoS system 600 including a UT 602, an NGSG 604, an SGW 606, a PGW 608 and a peer 610. QoS for satellite air traffic from the UT 602 to the peer 610 is managed by the NGSG 604 using QCI based QoS bearer 622. The NGSG 604 supports Differentiated Quality of Service for different flows across the satellite air interface via the use of advanced schedulers based on QCI associated with the flow. The NGSG 604 maps the QCI based traffic to S1 QoS DSCP tunnels 624. As such, IP DiffServ based QoS is provided via S1 QoS DSCP tunnels 624 (S1/S5 tunnels) for consistent end-to-end service 612 across a next generation 4G network that includes a satellite link. The QoS system 600 utilizes an E-RAB 618, a S5/S8 link 620, an EPS link 614, and an external link 616 as defined by the next generation 4G network standards.

The QoS system 600 provides differentiated QoS via a scheduler that exhibits fairness, self-scaling and work-conserving properties, for example, a Weighted fair queueing (WFQ) scheduler. WFQ automatically smooths out the flow of data in packet-switched communication networks by sorting packets to minimize the average latency and prevent exaggerated discrepancies between the transmission efficiency afforded to narrowband versus broadband signals. WFQ provides a fair share when all classes have backlogged traffic, maintains a ratio of bandwidths to different classes, and fully utilizes available bandwidth whether or not traffic from all classes is present.

The QoS system 600 uses schedulers to support differentiated QoS, Best-Effort and Legacy traffic seamlessly. The scheduler accommodates and handles jointly a mixture of Guaranteed Bit Rate (GBR) and Best-Effort (BE) traffic. In some embodiments, the scheduler first meets any GBR requirements.

Fair Access Policy (FAP)

NGSG supports FAP based on existing 3GPP core network features even though 3GPP does not have an explicit standard related to FAP. The present teachings use 3GPP features that can be implemented to provide the intent of FAP. These features include the Online Charging System (OCS) and Usage Monitoring control. The NGSG uses these features similarly by reacting to triggers from MME. For example, the NGSG reacts to a Bearer Modify Request message from MME to adjust radio resources for the corresponding user terminal.

An Access Point Name (APN) may be assigned an Aggregate Bit Rate (AMBR) referred to as APN-AMBR. The APN-AMBR is a subscription parameter stored per APN. It limits the aggregate bit rate that can be expected to be provided across all non-GBR bearers and across all PDN connections of the same APN (e.g. excess traffic may get discarded by a rate shaping function). A UE-AMBR limits the aggregate bit rate that can be expected to be provided across all non-GBR bearers of a UE (e.g. excess traffic may get discarded by a rate shaping function). Each of those non-GBR bearers could potentially utilize the entire UE-AMBR, e.g. when the other non-GBR bearers do not carry any traffic. GBR bearers are outside the scope of UE AMBR.

Figure 7:
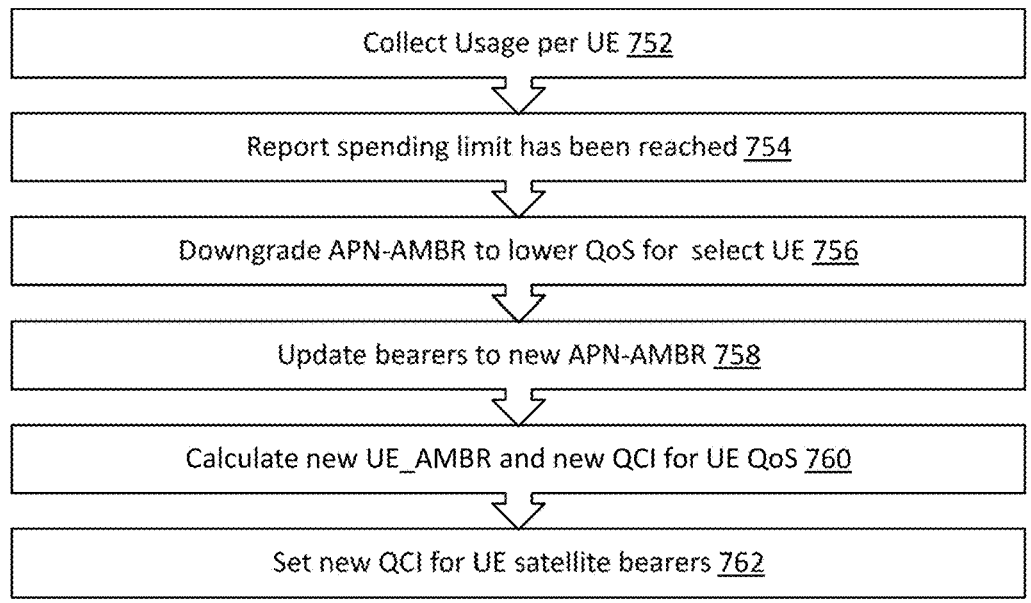
FIG. 7 illustrates a method for supporting Fair Access Policy (FAP) according to various embodiments.

FIG. 7 illustrates a method for supporting Fair Access Policy (FAP), according to various embodiments.

A method 750 for supporting Fair Access Policy (FAP) in a satellite network supporting 4G services 752 to collect usage per UE. The collecting of the usage may be performed by a PGW to an OCS or usage monitoring control in the 4G environment. The may include an operation 754 to determine and report that spending limit has been reached. The determining and reporting may be from the usage monitoring control to a PCRF. The method 750 may include an operation 756 to downgrade an APN-AMBR for the select UE to affect a lower QoS. The downgrade request (downgrade APN-AMBR, QOS) may be from the PCRF to a PGW. The method 750 may include an operation 758 to update the APN bearer with a new APN-AMBR to affect the new QoS, for example, as an update request (New APN-AMBR, QOS to MME via SGW). The method 750 may include operation 760 to set a UE_AMBR for the select UE (UE_AMBR=$\Sigma_{k=1}^{n}$APN_AMBR$_k$) to update the QoS for the satellite air interface based on the calculated UE_AMBR and send a bearer modify request (New-AMBR, QoS) to the NGSG. The method 750 may include operation 762 for the NGSG to set the new QCI associated with the satellite bearers serving the select UE to the new QCI corresponding to the new UE-AMBR. The NGSG propagates the new QCI to the satellite air interface to implement the FAP feature.

Security Aspects

The present teachings support security, based on 3GPP standards, at various layers including, Non-Access Stratum (NAS) Security, Access Stratum (AS) Security and flows with end-to-end application layer encryption carried transparently across the NGSG.

4G LTE core networks provide 256-bit keys to eNB. However, prior art terrestrial LTE uses a truncation function in an eNode (eNB) and only uses 128-bits out of 256-bits to provide AES-128, rather than AES-256, encryption. In the present teachings, a NGSG does not truncate the 256-bit keys to 128-bits. The non-truncated 256-bit keys are used for AES-256 encryption at link layer in Access Stratum for both a network side and a UT side.

As NGSG may translate a UT's geolocation to an appropriate Tracking Area before registration. The early security association in access stratum permits a geolocation, for example, a GPS position, to be encrypted before any 3GPP procedures are executed. This permits for geolocation hiding via encryption. In some embodiments, a Diffie-Hellman Key Exchange between a NGSG and a UT may initially permit a UT to encrypt its position on RACH. The NGSG transmits a shared key on a per UT basis. A shared key is always transmitted in clear in any Diffie Hellman key exchange.

Figure 8:
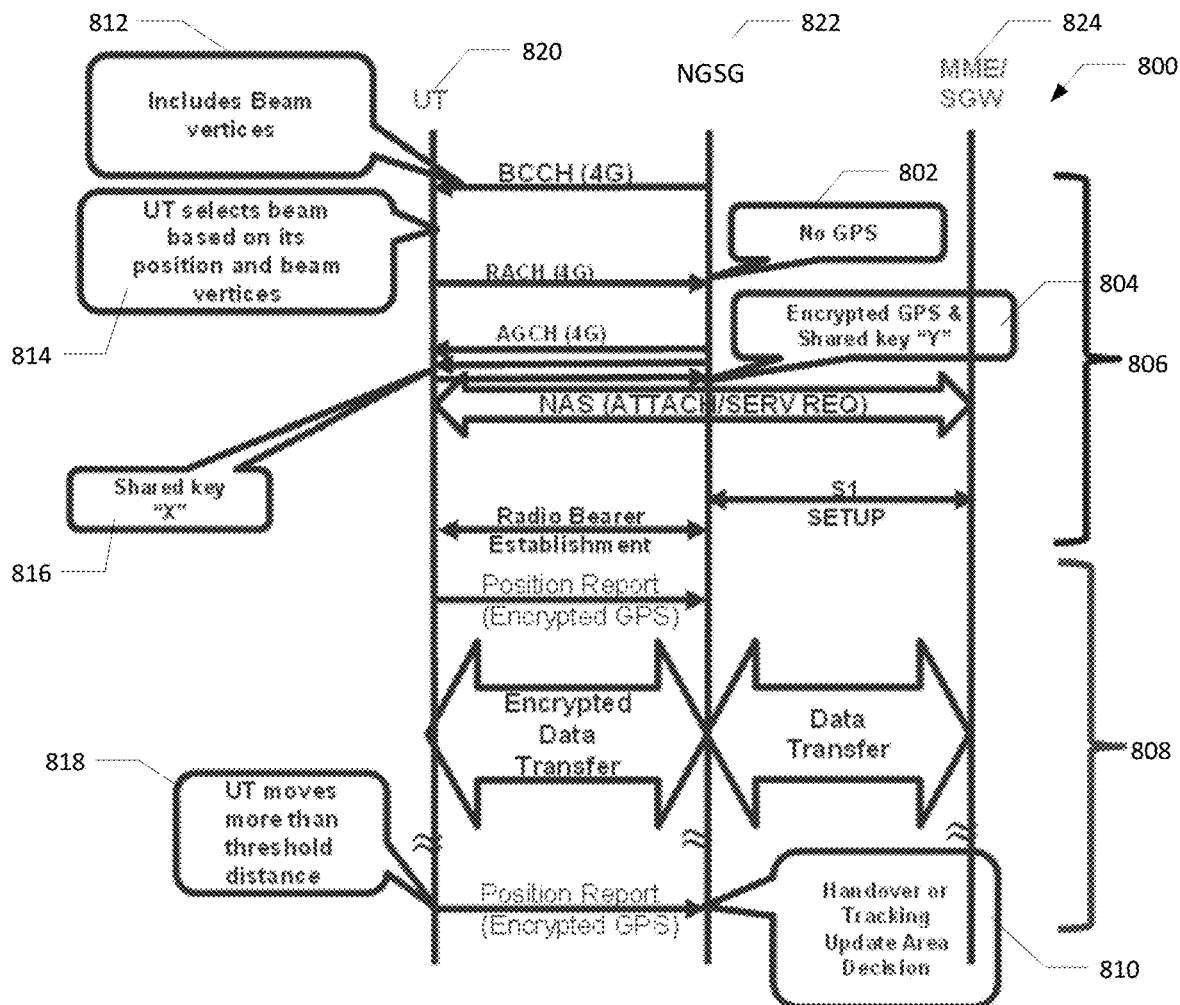
FIG. 8 illustrates a method of hiding a geolocation of UT according to various embodiments.

FIG. 8 illustrates a method of hiding a geolocation of UT according to various embodiments.

A method 800 includes a UT 820, a NGSG 822 and an MME/SGW 824. When the UT 820 is in ECM IDLE Mode 806, no 3GPP Access Stratum Encryption is available to the UT 820. In ECM IDLE mode 806, the UT 820 extracts beam vertices at operation 812 from a global beam. At operation 814, the UT 820 sends RACH request without a geolocation therein as the AS encryption is unavailable. When the NGSG 822 receives the RACH request without a geolocation at operation 802. Further to operation 802, the method 800 proceeds to operation perform an Diffie Hellman Key Exchange 804 between NGSG 822 and UT 820, where a shared key "X' is received by the UT 820 at operation 816. Further to operation 816, the UT 820 transmits an encrypted geolocation and a share key "Y" to the NGSG at operation 804.

When the UT 820 is in ECM CONNECTED Mode 808, 3GPP Access Stratum Encryption is available to the UT 820. As such, when the UT 820 needs to transmit its geolocation, for example, due to a UT movement, the new geolocation of the UT 820 is transmitted with the encrypted 3GPP AS encryption at 818. In response to operation 818, the NGSG 822 may trigger a handover or tracking update area decision at operation 810.

Position Based Restriction

The early security association of the present teachings prevents or restricts registration from designated regions. For example, a spot beam can span multiple countries or geographically restricted regions. When position-based registration restrictions exist, then a UT may be prevented or restricted from registering based on the UT's geolocation without regard to a spot-beam they are using for connecting. This may be implemented by a NGSG as the UT's geolocation is provided (encrypted) to the NGSG before the NGSG communicates with the Core Network for registering the UT.

Seamless Handover

A position-based handover enhances end-user Quality of Experience (QoE). GMR-1 4G supports seamless beam-to-beam handover. When a UT reports its geolocation and the UT has moved by more than a threshold distance for an air interface (for example, a satellite air interface), the NGSG may determines if the UT is close enough to an adjacent beam. A position-based handover is more reliable and minimizes the interruption compared to a measurement handover. In some embodiments, when GBR rates are in place for mobile UTs, the NGSG may ensure that GBR rates in the source beam for that UT is available in target beam. The NGSG may use an Allocation/Retention Priority (ARP) attribute to pre-empt existing flows when necessary to ensure the GBR. ARP is a standard feature available on the S1-MME interface that provides guidelines to base station on whether one session can preempt other.

Push to Talk (PTT)

The teachings disclose a Unicast/Multicast PTT over Satellite including an Over the top solution optimized for satellite. In some embodiments, the PTT provides resource-efficient multicast bearer support, text messaging and supplementary services, key management and over-the-air rekeying (OTAR), secure location tracking, interworking with Land Mobile Radio (LMR) (APCO P25, TETRA, etc.), interworking with MCX IWF (3GPP MC-PTT evolving standard), and interworking with PSTN and PABX.

An "Over the top" PTT over IP architecture results in lower complexity and deployment cost as compared to 3GPP MCX architecture (MC-PTT). The reduced requirements and cost in core network functions simplifies implementation (only basic EPC needed, no IMS). One example of an "Over the top" PTT over IP is the Etherstack PTT technology that is purpose-built and proven over satellite (BGAN, Iridium, others).

The PTT may be paired with targeted optimizations in the NGSG network. For example, preestablished bearers to support PTT can eliminate setup time overhead and resource allocation may be optimized for half-duplex nature of PTT. In some embodiments, multicast bearer support may be provided for even more radio resource efficiency. PTT over IP is compatible with LMR and works with current and future (MCX) 3GPP PTT technologies. As such, a wide variety of ruggedized platforms and accessories including portable clients from third parties can be supported. In some embodiments, third party consoles, gateways and devices through an interworking function may be supported.

Figure 9:
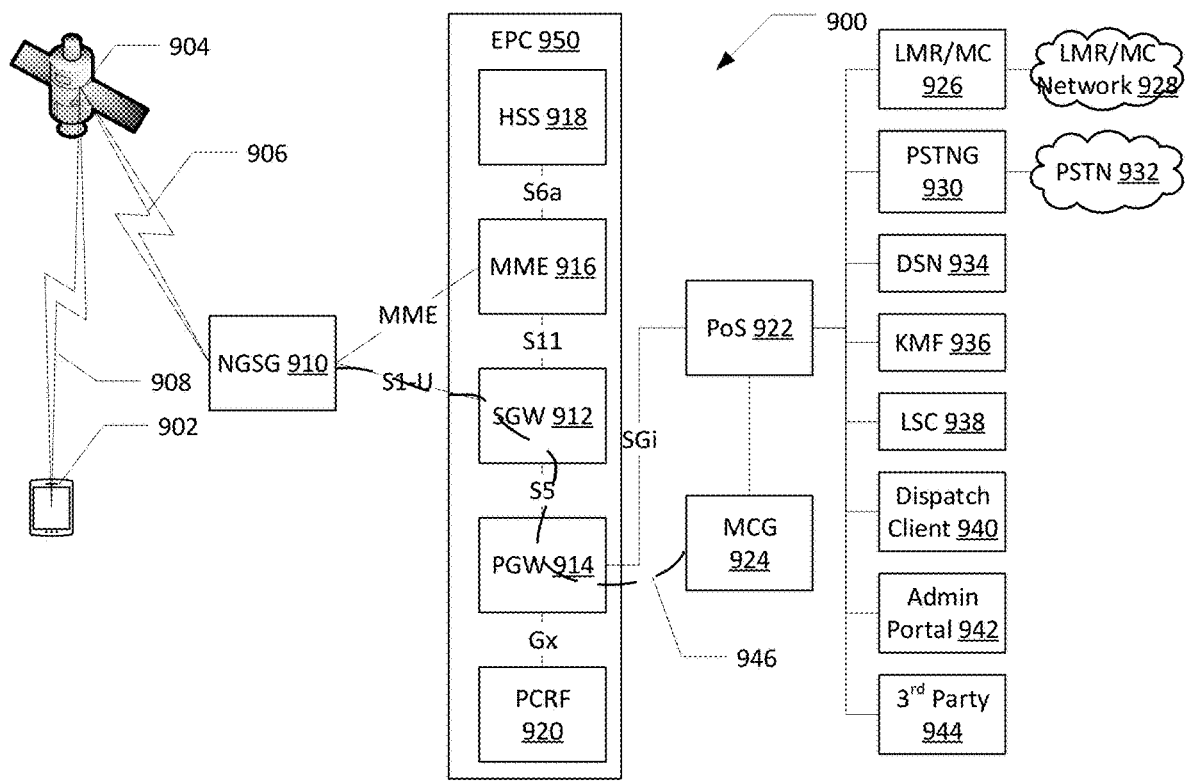
FIG. 9 illustrates a PTT system according to various embodiments.

FIG. 9 illustrates a PTT system according to various embodiments.

A PTT system 900 may include a UT 902 connected via a satellite 904 to an NGSG 910. RF links 906, 908 may be relayed by the satellite 904 and may use a waveform that is compliant with GMR-1 4G air interface. The PTT system 900 may include an EPC 950 connected to the NGSG 910. The EPC 950 may include an HSS 918, an MME 916, an SGW 912, a PGW 914 and a PCRF 920. The EPC 950 may be connected to a PTT over Satellite (POS) gateway 922. The POS gateway 922 may be connected to supplementary services, privacy services, location tracking services and the like. For example, the POS gateway 922 may be connected to an LMR/MC gateway 926, a PSTN gateway 9930, a DSN gateway 934, a KMF gateway 936 and an LSC gateway 938. The POS gateway 922 may also be connected to a dispatcher client 940, an admin portal 942, and a third-party console 944. The LMR/MC gateway 926 may be connected to an LMR/MC network 928. The PSTNG 930 may be connected to a PSTN/VoIP network 932.

In some embodiments, PTT unicast signaling and media from the UT 902 to the POS gateway 922 may be carried over the EPC 950. In some embodiments, multicast carried over the EPC 950 may be conveyed via a tunnel 946 (shown in a dashed line) in unicast to a multicast gateway (MCG) 924. There may be one tunnel per participant in the multicast. The MCG 924 be connected to the POS gateway 922 and utilize its services to complete the PTT connections. Multicast drastically reduces required resources for large talk groups. The MCG 924 may distribute multicast PTT over the EPC 950. A Point-to-multipoint (PTM) radio bearer support may be provided in the NGSG 910.

The UT 902 may be an embedded PTT client, a smart phone PTT client, a legacy device. In some embodiments, the UT 902 may not be satellite communication capable. In such embodiments, the UT 902 may include a satellite radio user terminal that is a gateway from a local network such as Wi-Fi to the satellite network.

The DSN gateway 934 (Data Services Node) may support messaging and other supplementary services (status, emergency, stun/unstun, OTAR, . . . ). The DSN 950 may be an enabler for location and crypto services. The KMF gateway 936 (Key Management Facility) may provide centralized management and distribution of encryption keys. The KMF gateway 936 may support Over-The-Air Rekeying (OTAR) of clients. The LSC gateway 938 (Location Services Center) may provide secure location tracking of PTT users and encrypted storage of location information. The LSC gateway 938 may be optimized to reduce unnecessary location updates. A Radio Interface Gateway (RIG) (not shown) may be connected to the PoS gateway 922 for basic LMR interworking. The LMR/MC gateway 926 may provide interworking with APCO P25 (ISSI, CSSI, DFSI), TETRA (ISI and proprietary RoIP variant support), DMR (AIS), RoIP and legacy analog standards such as 4 W E&M, CTCSS/DCS, SELCAL etc. The LMR/MC gateway 926 may operate with standard interfaces to whole ecosystem of 3rd party CSSI-based consoles and ISSI radio subsystems. The LMR/MC gateway 926 may interwork with future MC-PTT standards-based networks. The PSTNG 930 may connect provide a PSTN and VoIP gateway function. The PSTNG 930 may be a SIP based carrier level PSTNG/PABXG telephony gateway. The PSTNG 930 may support digital (VOIP, T1/E1, ISDN) and analog (2 W DTMF) interfaces.

In some embodiments, the NGSG may support PTT optimizations. The NGSG supports differentiated QoS. PTT is an OTT application that uses priority non-GBR QoS including DSCP that may be mapped to various QCIs. For example, DSCP 40, 34, 36 may be mapped to QCIs 5, 6, 7 at the EPC. In some embodiments, the scheduler behavior is optimized for PTT application characteristics. EPS bearers for PTT may be setup automatically on connecting to a PTT Access Point Network (APN) to reduce call setup latency and integration complexity.

The OTT implementation of PTT uses a low-rate ES-EE-IMBE vocoder (4.4 kbps, frame concatenation), and RoHC header compression over the air. Furthermore its protocols are delay-tolerant and designed for low resource consumption. Lastly, there is no uplink media resource usage by non-talkers. In some embodiments, unsolicited grants to group call participants improves response to "Talk" button press. In other embodiments, Anticipatory grants on push of "Talk" button reduce latency.

In some embodiments the NGSB supports resource-efficient multicast. The Multicast feature maybe application-agnostic and may be used for PTT, video, software distribution or the like. A Point-To-Multipoint (PTM) bearer on each carrier group having an "subscribed" UE. Each "subscribed" UE may receive a multicast C-RNTI (M-RNTI) for the PTM bearer. A PTM bearer can carry data for multiple IP multicast groups (e.g. PTT sessions) with the same QCI.

A protocol between UEs and NGSG to manage UE/multicast group/carrier subscription/association may be provided.

The present teachings support Multicast-in-Unicast IP over the EPC. A Multicast Gateway (MCG) sends source multicast wrapped in unicast over the EPC to the NGSG, for each subscribing UE. A m-in-u tunnel per UT participating in multicast, per QCI is used by the NGSG. The m-in-u tunnel can carry data for multiple IP multicast groups for the same UT. The NGSG un-tunnels and redistributes the multicast data on PTM bearers as needed based on UE "subscription".

TCP Performance Enhancing Proxy (PEP)

PEP reduces the long delay induced deficiencies of slow start, window size limitation, acknowledgement policy and flow control. PEP breaks user end to end TCP connection into two separate TCP legs one between end user and the UT and the other between GW and the remote user end point. The PEP then bridges the two TCP legs with a satellite adapted reliable backbone protocol (PEP Backbone Protocol) that reduces ACKs over the PEP backbone protocol air interface. In some embodiments, PEP may use one backbone connection per each EPS bearer (per set of QoS parameters). In some embodiments, Multiple TCP connections of the same class may be multiplexed on an EPS bearer.

Unsolicited Uplink Grants (UUG)

Unsolicited Grants in results in faster delivery of TCP Acknowledgements—therefore significant end-user benefits compared to 4G-LTE MAC over Satellite. This significantly improves application layer throughput. UUG may be used to transfer other uplink messages that require an acknowledgement including HTTP GETs. UUG improves TCP performance even when IPSec is employed. UUG also works for non-TCP sessions including PTT.

UUG operates by saving more than one round-trip time over the satellite link to transfer TCP acknowledgements. This saving of time results in faster TCP window growth. As such, application layer throughput and end-user Quality of Experience (QoE) is improved. This method works regardless of whether the session is secure or not. The method may be extended to non-TCP applications. For example, this method can provide speculative grants to PTT users who have requested for floor grants.

Figure 10:
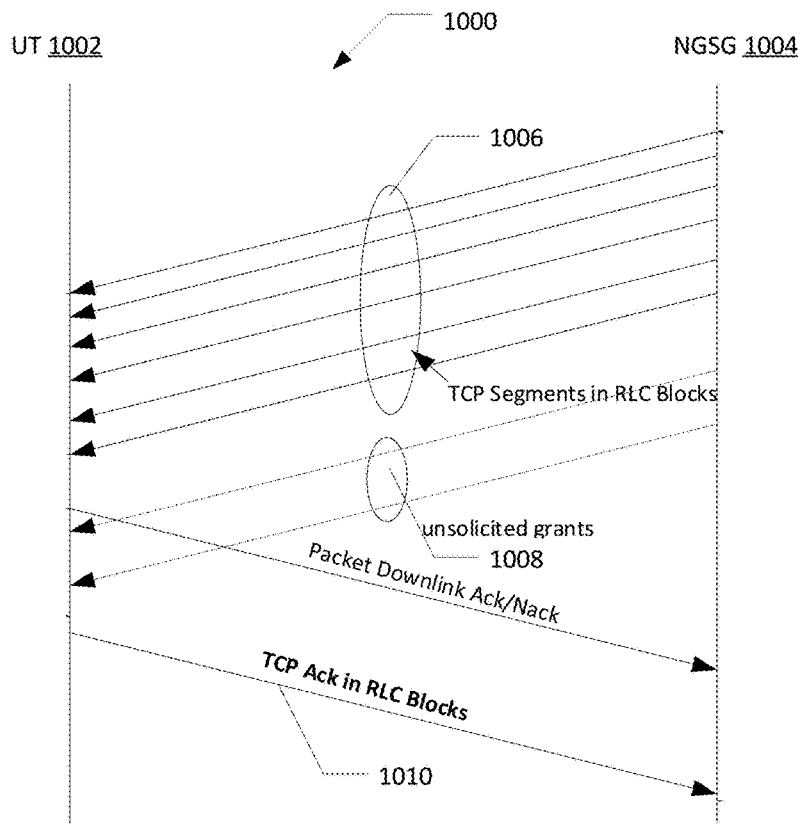
FIG. 10 illustrates unsolicited uplink grants at MAC layer triggered by network according to various embodiments.

FIG. 10 illustrates unsolicited uplink grants at MAC layer triggered by network according to various embodiments.

A Network 1000 may include a UE 1002 and an NGSG 1004. The NGSG 1004 may detect that TCP protocol is being used for conveying by a Packet Data Traffic Channel 1006. When TCP traffic is detected, the NGSG 1004 may provide speculative (unsolicited) grants 1008 to the UE 1002 to transmit TCP Acknowledgements 1010 on an uplink.

Open Platform Concept

An Open Platform system may be used to provide services by multiple operators seamlessly without requiring hardware or hardware modifications. Multiple Virtual Network Operators (VNOs) operators may use an exclusive or a shared NGSG. When NGSG resources are shared between multiple operators, NGSG supports MOCN concept as defined in 3GPP TS 23.251. Priorities can be assigned to different operators based on configuration.

Segregation of traffic belonging to different operators may use the MOCN (Multiple Operator Core Network) principles laid out in 3GPP TS 23.251. Each operator is identified by a unique PLMN (Public land mobile network) ID. User terminals (based on their USIM cards issued by its operator) selects an appropriate PLMN-ID based on PLMN-IDs broadcasted by a NGSG in the System Information on the BCCH. The NGSG routes corresponding signaling and user data traffic on different VLANs associated with the PLMN-IDs.

Figure 11:
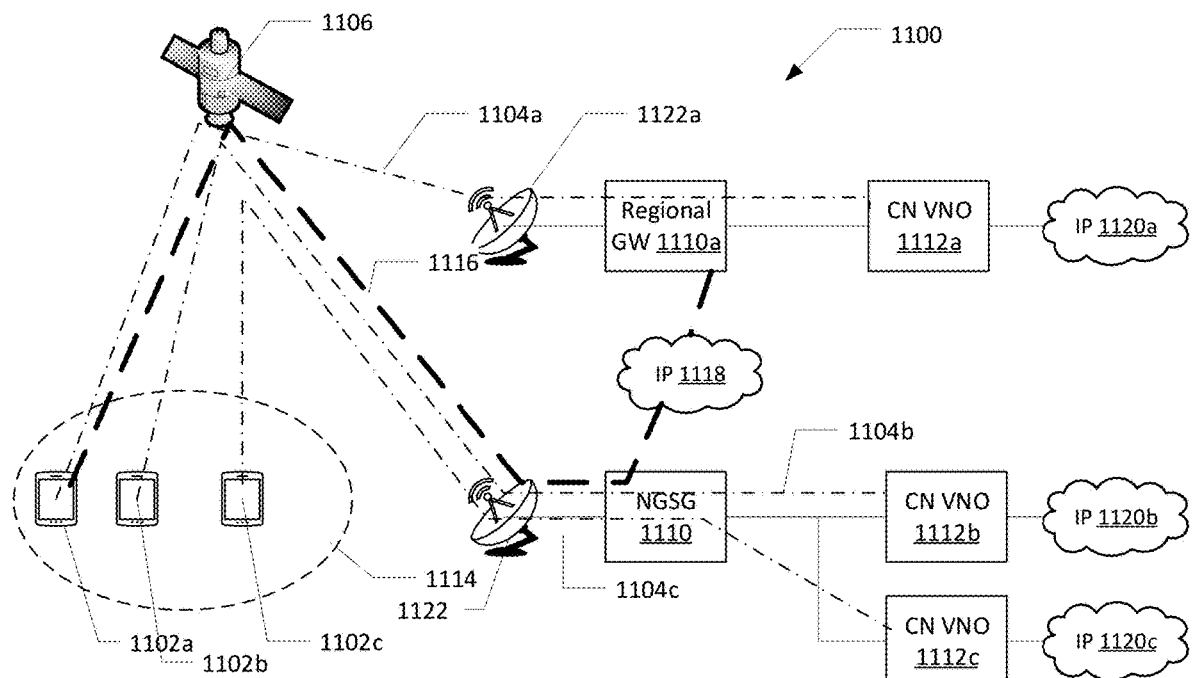
FIG. 11 illustrates an Open Platform system including an Air interface design for NGSG according to various embodiments.

FIG. 11 illustrates an Open Platform system including an Air interface design for NGSG according to various embodiments.

An Open Platform system 1100 may provide services for VNO operators A, B and C. CN services for UE 1102a of VNO operator A may be provided via link 1104a connecting the UE 1102a to a satellite 1106, an RFT 1122a, a regional gateway 1110a, a CN 1112a and an IP network 1120a. CN services for UE 1102b of VNO operator B may be provided via link 1104b connecting the UE 1102b to the satellite 1106, an RFT 1122, a NGSG 1110, a CN 1112b and an IP network 1120b. CN services for UE 1102c of VNO operator C may be provided via link 1104c connecting the UE 1102c to the satellite 1106, an RFT 1122, a NGSG 1110, a CN 1112c and an IP network 1120c. As such, VNO operator A and VNO operator B share the RFT 1114 and the NGSG 1110, VNO operator C has RFT 1122a and the regional GW 1110a for its exclusive use. All the VNO operators provide core network services while sharing satellite 1106 resources.

When regional gateways are deployed and shared Common Control Channels are used, the NGSG may send the access requests to an appropriate RMS subsystem based on the PLMN-ID received in a Channel Request message received on the RACH channel. In this example, VNO operator C shares a common control channel 1116 with VNO operators B and C. The common control channel 1116 to the NGSG 1110 over an IP network 1118. This routing may be based on a configuration table without needing software updates in the NGSG 1110.

Diversity

Figure 12:
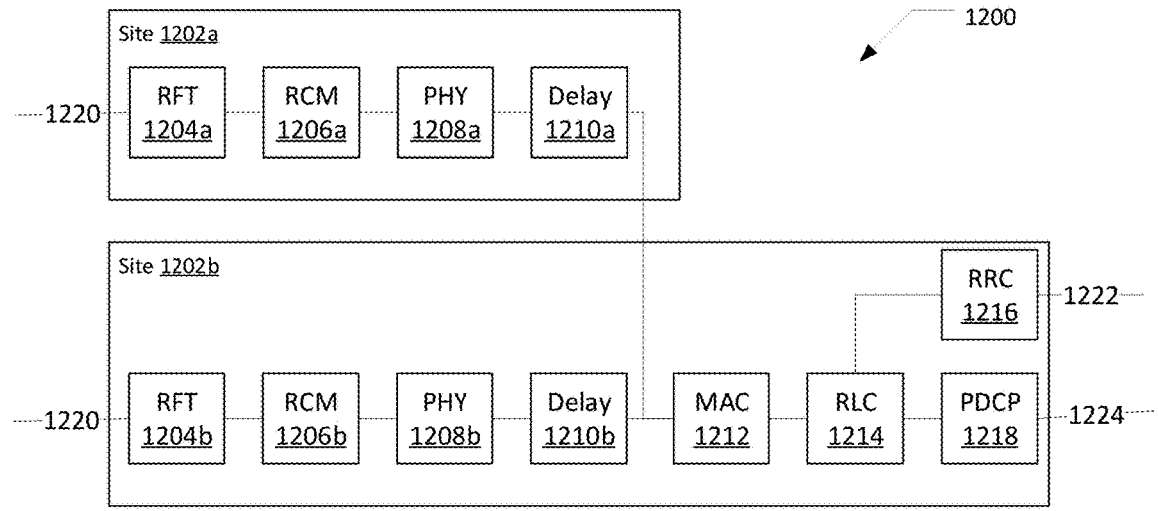
FIG. 12 illustrates a diversity satellite network according to various embodiments.

FIG. 12 illustrates a diversity satellite network according to various embodiments.

A diversity satellite network 1200 may use an integrated approach to diversity for legacy (2.5G) and next generation users (4G) by having ground radio stations at site 1202a and site 1202b. The diversity may be used to provide redundancy for some subsystems and/or to provide an alternative communication site due to signal fade. Site 1 202a may include a RFT 1204a, an RCM 1206a, a PHY layer 1208a and a delay 1210a. The RFT 1204a may communicate with the satellite (not shown) via a signal 1220. Site 1202b may include a RFT 1204b, an RCM 1206b, a PHY layer 1208b, a delay 1210b, a MAC layer 1212, a RLC layer 1214, a RRC layer 1216, and a PDCP layer 1218. The RFT 1204a and RFT 1204b may communicate with the satellite (not shown) via a signal 1220. The RRC layer 1216 may be connected to a legacy 2.5G network via a signal 1222. The PCP layer 1218 may be connected to a next generation 4G core network via a signal 1224.

In a forward link, the MAC layer 1212 in site 1212b always transmits the same MAC frame to site 1212a as well as the PHY layer 1208b of the site 1212b. If Ds is the delay between site 1202b and the satellite, Da is the delay between site 1202a and the satellite, and Das is max delay between site 1202a and 1202b, then delay 1210b is such that it is approximately |Ds−Da|+Das. In some embodiments, Ds and Da may be nearly constants when is at zero inclination; |Ds−Da| typically is less than 0.3 ms. Max Das should be less than 2-3 ms. PHY layer 1208a at site 1202b may always provide the sub-frame notification to MAC layer 1212 regardless of which site is disabled. Delay 1210a is such that it will reach the satellite at the same time as a MAC frame from site 1202b. Delay 1210b is therefore expected to be small compared to delay 1210a. Normally, Transmit Enable is turned ON in the RCM 1206b and turned OFF in RCM 1206a. Only one of RCMs 1206b or 1206a is ON at a time.

In a return link, both the RFT 1204a at site 1202a and RFT 1204b at site 1202b always receive transmissions from the satellite and send them to the MAC layer 1212. The MAC layer 1212 can select from one of the two streams aided by a rain-detection algorithm. Therefore there is no need for any RF-diversity specific signaling between a UT and Network for diversity. The diversity transparent to an end-user. In this approach a Core Network is unaware of rain diversity. As the approach replicates MAC layer frames on both links, this approach benefits both 2.5G and 4G users.

Satellite Air Interface

The satellite air interface has a low Peak-to-average power ratio (PAPR) that permits operating PA with higher efficiency. As illustrated by the table below the satellite waveform in exemplary modulation $\pi/2$-BPSK exhibits a lower PAPR than conventional BPSK. Similarly, the satellite waveform in exemplary modulation $\pi/4$-QPSK exhibits a lower PAPR than conventional QPSK and 4G QPSK. The satellite waveform in exemplary modulations 16-APSK or 32-APSK exhibit a lower PAPR than conventional 16-QAM or 4G 16-QAM. The satellite waveform in exemplary modulation.

In contrast, IoT transfers are typically very short (less than 50 bytes) and occur very infrequently. Establishing data bearers for such small transactions implies significant overhead 3GPP Release 13 introduced control-plane IoT in NB-IOT that reduces the number of round-trips before transferring IoT data. However, NB-IOT still incurs multiple round-trips.

The present teachings disclose a Satellite Narrow-Band IoT (SNB-IOT) to transfer small amounts of IoT data with zero round-trips using either an efficient RACH channel, or a NB IoT waveform with interference cancellation and multi-user detection (MUD). SNB-IOT solution is more efficient than NB-IOT. SNB-IOT provides a reduced overhead, low message transfer delay, low battery consumption, reduced interference, reduced satellite power consumption and improved capacity.

GMR-1 4G RACH operates at $E_s/N_o$ of about −2 dB. The present teachings achieve nearly a 7 dB of additional robustness compared to GMR-1 RACH. Therefore GMR-1 4G RACH permits reliable RACH operation even when UT EIRP<−1 dBW. GMR-1 4G RACH accommodates approximately 18 bytes of payload. As such, it is useful for transmitting IoT types of data (including location reports from Search and Rescue terminals or Personnel Tracker

| BPSK | Sat. $\pi/2$-BPSK | QPSK | 4 G LTE SC-FDMA QPSK | Sat. $\pi/4$-QPSK | 16 QAM | 4 G LTE SC-FDMA 16-QAM | Sat. 16-APSK | Sat. 32-APSK |
|---|---|---|---|---|---|---|---|---|
| 3.85 | 1.84 | 3.86 | ≥7.0 | 3.17 | 6.17 | ≥8.0 | 4.72 | 5.91 |

Physical layer for NGSG may be based on LDPC codes. LDPC codes are the most widely used codes in satellite systems since it performs better than Turbo codes. Lower Es/(No+Io) requirement of LDPC Codes (compared to Turbo) implies LDPC requires 1 to 1.5 dB of less satellite power than Turbo Codes. For example, for 20 ms 5×16 ASK performance in AWGN with an ideal receiver LPDC exhibits about an 0.6 dB gain at FER of 0.1%, which is even higher for lower FERs. In a C/I limited environment, a small reduction in required EsNo significantly improves link closure.

Internet of Things (IOT) Over Satellite

Traditional IP wireless data systems, including 4G-LTE, first establish a data bearer before transferring user data across the wireless link. Establishing data bearers involves many round-trips between user terminal and core network. These system are designed for applications such as web browsing, audio/video streaming, e-mail, web conferencing, file transfers etc. In each of the above applications, the amount of data transferred is large (more than several Mbytes). Therefore the overhead incurred in establishing data bearers is a tiny fraction of the user data transferred over the data bearer.

terminals) on RACH channel efficiently without needing to establish RRC connection or Data Radio Bearers (DRB) needed in NB-IOT.

The SNB-IOT waveform may be identical to a Global beam waveform. As seen from the table below, these waveforms operate much below the noise floor (less than −6.5 dB Es/No). Small devices (0 dBW EIRP and −30 dB/K G/T) and a global beam may be used to offer SNB-IOT services. Spreading/repetition permits multiple user terminals to transmit at the same time on the same carrier and still be successful based on a MUD receiver at the gateway. In the table, the first two formats may be used for a forward link. In the table, the third format may be used for a return link.

| Burst Format | Tx Rate in ksps | Burst Duration in ms | Modulation | Spreading/ Repetition | FEC rate | FEC type | Peak Payload Rate in kbps | Required Es/No, AWGN |
|---|---|---|---|---|---|---|---|---|
| FCCH (1, 24) | 23.4 | 40 | Dual-Chirp | | | N/A | | −6.5 |
| PNB (1, 72) | 23.4 | 120 | $\pi/2$-BPSK | 4 | 0.25 | Conv./ Turbo | 1.27 | −6.5 |
| NB-PNB (0.25, 384) | 5.85 | 640 | $\pi/2$-BPSK | 8 | 0.25 | Conv. | 0.1 | −9.5 |

Figure 13:
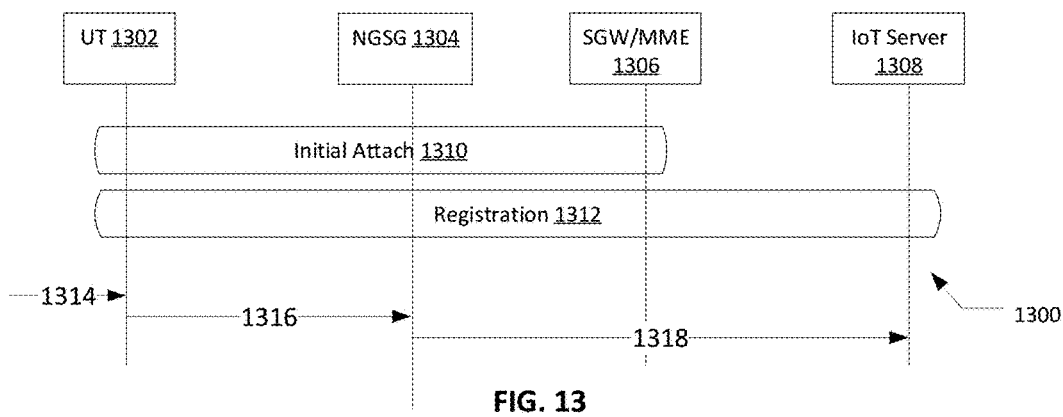
FIG. 13 illustrates an exemplary SNB-IOT transfer according to various embodiments.

FIG. 13 illustrates an exemplary SNB-IOT transfer according to various embodiments.

A SNB-IOT transfer 1300 may begin with a UT 1302 being provisioned with an initial attach 1310 to an SGW/MME 1306 via an NGSG 1304. After the initial attach 1310, the UT 1302 may send a registration 1312 to an IoT server. After the initial attach 1310 and registration 1312, the UT 1302 need not attach or register again. The initial attach 1310 and registration 1312 may be performed using an SNB-IOT channel, for example, NB channel 456 of FIG. 4A.

When the UT 1302 receives (from a sensor or external device) IoT Data 1314, the UT 1302 sends a SNB-IOT message 1316 based on the IoT data 1314 using the SNB-IOT channel. The NGSG 1304 forms a packet including at least the IoT data 1314, a destination address of the IoT server 1308 and a source address identifying the UT 1302. The destination and source addresses may be mapped from a UT identifier included in the SNB-IOT message 1316. The packet is then forwarded by the NGSG 1318 to the IoT server 1308 via the SGW/MME 1306 using a packet protocol such as IP. Multiple transmissions of the IoT data 1314 may be performed by the UT 1302 without the initial attach 1310 or the registration 1312.

Spectrally Efficient Satellite VOIP

The satellite air interface may support 1× channel for VOIP. The VOIP permits a single-hop secure telephone to telephone VOIP call and secure PTT with carrier switching at satellite. The spectrally efficient channel uses robust modulation to operate in low SNR environments. The spectrally efficient channel may permit better power amplifier operation in terminals due to its low Peak-to-Average Power Ratio compared to w/4 QPSK.

GMR-1 4G air interface may support spectrally efficient and power efficient VoIP with zero-byte header compression for VOIP for circuit-switched spectral efficiency. The header compression improves capacity, saves satellite power and improves UT battery life. GMR-1 4G air interface may support an AMBE+2 voice codec to provide improved voice quality with 4 kbps voice codec compared to previous generation AMBE+ voice codec used in GMR-1 system. In some embodiments, a 2.45 kbps voice codec may be available.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim:

1. A computer-implemented method for multiplexing a first-generation User Equipment (UE) and a second-generation UE on a satellite channel, the method comprising:
    allocating, with a scheduler, timeslots for Time-Division Multiple Access (TDMA) of the satellite channel;
    associating, with a Next Generation Service Gateway (NGSG), a first timeslot of the timeslots with a first-generation UE traffic and a second timeslot of the timeslots with a second-generation UE traffic; and
    communicating, via the satellite channel using a Radio Frequency Transceiver, between the NGSG and the first-generation UE in the first timeslot and between the NGSG and the second-generation UE in the second timeslot.

2. The method of claim 1, further comprising: receiving, at the NGSG, a packet in a select timeslot of the timeslots; and sending the packet either to a first-generation Core Network (CN) when the select timeslot is the first timeslot or to a second-generation CN when the select timeslot is the second timeslot.

3. The method of claim 2, wherein the select timeslot is the second timeslot and the sending maps the second-generation UE traffic from a satellite Access Spectrum/Non-Access Spectrum (AS/NAS) stack to a terrestrial second-generation stack.

4. The method of claim 1, further comprising sending a packet in a select timeslot of the timeslots from the NGSG either to the first-generation UE when the select timeslot is the first timeslot or to the second-generation UE when the select timeslot is the second timeslot.

5. The method of claim 4, further comprising mapping the second-generation UE traffic from a terrestrial second-generation stack to a satellite AS/NAS stack when the select timeslot is the second timeslot.

6. The method of claim 1, wherein the satellite channel comprises an aggregated channel comprising a plurality of carriers.

7. The method of claim 1, wherein the allocating schedules a frequency and duration of the first timeslot based on an anticipated first-generation traffic.

8. The method of claim 1, wherein the first-generation UE traffic comprises a ($2.5^{th}$ Generation) 2.5G traffic and the second-generation UE traffic comprises a Fourth Generation (4G) traffic.

9. The method of claim 8, further comprising sending an encrypted geolocation of a 4G UE prior to attaching the 4G UE to a 4G CN.

10. The method of claim 8, further comprising differentiating a Quality of Service (QOS) for each flow of the 4G traffic based on a Quality Class Identifier (QCI) associated with each of the flows.

11. The method of claim 10, wherein the differentiating is performed by a Weighted fair queueing (WFQ) scheduler.

12. The method of claim 10, wherein the differentiating first accommodates a Guaranteed Bit Rate (GBR) before a Best-Effort (BE) traffic.

13. The method of claim 8, further comprising implementing a Fair Access Policy (FAP) based on a trigger from a 4G CN managing the 4G traffic.

14. The method of claim 8, further comprising sending a Push to Talk (PTT) message from a 4G UE to a multicast gateway in a unicast for multi-casting.

15. The method of claim 8, further comprising sending unsolicited grants from the NGSG for Transmission Control Protocol (TCP) flows associated with the 4G traffic.

16. A system to multiplex a first-generation User Equipment (UE) and a second-generation UE on a satellite channel, the system comprising:
    a scheduler to allocate timeslots for Time-Division Multiple Access (TDMA) of the satellite channel;
    a Next Generation Service Gateway (NGSG) to associate a first timeslot of the timeslots with a first-generation UE traffic and a second timeslot of the timeslots with a second-generation UE traffic; and
    a Radio Frequency Transceiver (RFT) to communicate, via the satellite channel, between the NGSG and the first-generation UE in the first timeslot and between the NGSG and the second-generation UE in the second timeslot.

17. The system of claim 16 wherein the select timeslot is the second timeslot and the sending maps the second-generation UE traffic from a satellite Access Spectrum/Non-Access Spectrum (AS/NAS) stack to a terrestrial second-generation stack.

18. The system of claim 16, further comprising: receiving, at the NGSG, a packet in a select timeslot of the timeslots; and sending the packet either to a first-generation Core Network (CN) when the select timeslot is the first timeslot or to a second-generation CN when the select timeslot is the second timeslot.

19. The system of claim 16, wherein the first-generation UE traffic comprises a ($2.5^{th}$ Generation) 2.5G traffic and the second-generation UE traffic comprises a Fourth Generation (4G) traffic.

20. The system of claim 19, wherein the scheduler sends unsolicited grants from the NGSG for Transmission Control Protocol (TCP) flows associated with the 4G traffic.

* * * * *